(12) United States Patent
Shin et al.

(10) Patent No.: US 8,842,942 B2
(45) Date of Patent: Sep. 23, 2014

(54) OPTICAL MODULATOR FORMED ON BULK-SILICON SUBSTRATE

(75) Inventors: Dong-jae Shin, Seoul (KR); Kyoung-won Na, Seoul (KR); Sung-dong Suh, Seoul (KR); Kyoung-ho Ha, Seocho-gu (KR); Seong-gu Kim, Pyeongtaek-si (KR); Ho-chul Ji, Yongin-si (KR); In-sung Joe, Seoul (KR); Jin-kwon Bok, Suwon-si (KR); Pil-kyu Kang, Anyang-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 277 days.

(21) Appl. No.: 13/012,036

(22) Filed: Jan. 24, 2011

(65) Prior Publication Data
US 2011/0194803 A1 Aug. 11, 2011

(30) Foreign Application Priority Data

Feb. 8, 2010 (KR) .................. 10-2010-0011471
Feb. 8, 2010 (KR) .................. 10-2010-0011472

(51) Int. Cl.
*G02B 6/42* (2006.01)

(52) U.S. Cl.
USPC .................................. 385/3; 385/40

(58) Field of Classification Search
CPC .......... G02B 5/30; G02B 6/42; G02B 6/0056; G02B 6/12; G02B 5/00; G02B 6/26; G02B 6/30; G02F 1/025; G02F 1/035; G02F 1/2257
USPC ............................................................ 385/3
See application file for complete search history.

(56) References Cited

U.S. PATENT DOCUMENTS

| | | | | |
|---|---|---|---|---|
| 6,374,001 B1* | 4/2002 | Bozeat et al. | ...................... | 385/8 |
| 6,522,794 B1* | 2/2003 | Bischel et al. | ..................... | 385/4 |
| 7,103,252 B2* | 9/2006 | Ide | ................. | 385/131 |
| 8,374,469 B2* | 2/2013 | Yamada | ......................... | 385/14 |
| 2003/0081922 A1* | 5/2003 | Ide | ................. | 385/129 |
| 2005/0163459 A1* | 7/2005 | Deliwala | ...................... | 385/147 |
| 2007/0058896 A1* | 3/2007 | Toyoda et al. | ..................... | 385/3 |
| 2008/0212913 A1 | 9/2008 | Gill et al. | | |
| 2009/0324163 A1* | 12/2009 | Dougherty et al. | ............. | 385/14 |
| 2010/0232742 A1* | 9/2010 | Yamada | ......................... | 385/14 |
| 2010/0266232 A1* | 10/2010 | Lipson et al. | ..................... | 385/1 |
| 2010/0290732 A1* | 11/2010 | Gill | ................. | 385/3 |
| 2011/0176762 A1* | 7/2011 | Fujikata et al. | ................... | 385/2 |
| 2011/0268401 A1* | 11/2011 | Wei | .............................. | 385/122 |
| 2012/0230630 A1* | 9/2012 | Dougherty et al. | ............. | 385/14 |
| 2012/0294564 A1* | 11/2012 | Bhave et al. | ...................... | 385/2 |

FOREIGN PATENT DOCUMENTS

JP 08043654 2/1996
JP 08201649 A 8/1996

(Continued)

OTHER PUBLICATIONS

Japanese Office Action Dated Jun. 24, 2014 in Corresponding Japanese Application JP2011-025093.

*Primary Examiner* — Kaveh Kianni
(74) *Attorney, Agent, or Firm* — Volentine & Whitt, PLLC

(57) ABSTRACT

An optical modulator comprises a bulk-silicon substrate comprising a trench having a predetermined width and a predetermined depth. A bottom cladding layer is formed in the trench, and a plurality of waveguides and a phase modulation unit are formed on the bottom cladding layer. A top cladding layer is formed on the plurality of waveguides and the phase modulation unit.

18 Claims, 26 Drawing Sheets

(56) References Cited

FOREIGN PATENT DOCUMENTS

| | | |
|---|---|---|
| JP | 09503869 | 4/1997 |
| JP | 2000056278 | 2/2000 |
| JP | 2000275472 | 10/2000 |
| JP | 2004506935 | 3/2004 |
| JP | 2004144886 A | 5/2004 |
| JP | 2004258119 A | 9/2004 |
| JP | 2004287116 | 10/2004 |
| WO | WO9508787 | 3/1995 |
| WO | WO0214935 | 2/2002 |

* cited by examiner

OPTICAL MODULATOR FORMED ON BULK-SILICON SUBSTRATE

CROSS-REFERENCE TO RELATED APPLICATIONS

This application claims priority under 35 U.S.C. §119 to Korean Patent Application No. 10-2010-0011471 filed on Feb. 8, 2010 and Korean Patent Application No. 10-2010-0011472 filed on Feb. 8, 2010, the respective disclosures of which are hereby incorporated by reference in their entirety.

BACKGROUND

Embodiments of the inventive concept relate generally to optical modulators. More particularly, embodiments of the inventive concept relate to optical modulators formed on a bulk-silicon substrate.

Traditionally, electrical and optical components of electronic devices have been fabricated separately and then connected to each other on a printed circuit board (PCB). These separate fabrication processes, however, tend to drive up the cost of the electronic devices. Accordingly, recent efforts have been dedicated to incorporating optical and electrical components into a single integrated circuit (IC). An IC comprising optical components can be referred to as an optical IC.

The optical components in an optical IC can be roughly classified as active devices and passive devices. Active devices are devices supplied with power, such as a light source, an optical modulator, or an optical receiver. Passive devices are devices not supplied with power, such as a waveguide, a coupler, an optical filter, or a multiplexer.

Optical modulators can be further classified into interferometer-type and resonant-type optical modulators. Interferometer-type optical modulators typically operate at high speeds, have a broad operating spectrum band, and are stable in the presence of temperature changes. However, interferometer-type optical modulators are relatively large compared to resonant-type optical modulators. Resonant-type optical modulators are generally smaller than interferometer-type optical modulators, but they typically have a narrower operating spectrum band and are more sensitive to temperature changes.

Optical modulators are commonly formed in a silicon-on-insulator (SOI) substrate, with a waveguide formed by a high refractive index silicon core surrounded by a low refractive index cladding layer. A buried oxide (BOX) of the SOI substrate can be used to form a bottom portion of the cladding layer. This can simplify the process of manufacturing the waveguide. Unfortunately, however, the SOI substrate is significantly more expensive than other types of substrates, such as a bulk-silicon (bulk-Si) substrate.

SUMMARY

Embodiments of the inventive concept provide optical modulators formed in a bulk-Si substrate and methods of operating the optical modulators.

According to one embodiment of the inventive concept, a modulator comprises a bulk-silicon substrate comprising a trench having a predetermined width and a predetermined depth, a bottom cladding layer formed in the trench, a plurality of waveguides formed on the bottom cladding layer, a phase modulation unit formed on the bottom cladding layer and configured to modulate a phase of an optical signal passing through a waveguide by modulating a refractive index of the waveguide, and a top cladding layer formed on the plurality of waveguides and the phase modulation unit.

In certain embodiments, a thickness of the bottom cladding layer is less than or equal to a depth of the trench.

In certain embodiments, a width of the bottom cladding layer formed under the phase modulation unit is within a range of about 1.5 μm to 10.0 μm.

In certain embodiments, a width of the bottom cladding layer formed under the plurality of waveguides is within a range of about 1.0 μm to 10.0 μm.

In certain embodiments, a horizontal distance between a center of the phase modulation unit and a center of the bottom cladding layer formed under the phase modulation unit is within a range of about 0.1 μm to 5.0 μm.

In certain embodiments, the phase modulation unit comprises a slab formed of a silicon layer on the bottom cladding layer, a core formed with a predetermined height on a portion of the slab, a first electrode for injecting a P-type carrier into the core, a second electrode for injecting an N-type carrier into the core, a P-type carrier doping unit connected to the first electrode and formed on the slab to perform doping with the P-type carrier, and an N-type carrier doping unit connected to the second electrode and formed on the slab to perform doping with the N-type carrier.

In certain embodiments, the P-type carrier doping unit and the N-type carrier doping unit are formed symmetrically with respect to the core and are formed on a portion of the slab.

In certain embodiments, the P-type carrier doping unit and the N-type carrier doping unit are further formed on a portion of the core.

In certain embodiments, the P-type carrier doping unit and the N-type carrier doping unit are formed symmetrically with respect to the core and are formed on an entire area of the slab and an entire area of the core.

According to another embodiment of the inventive concept, a modulator comprises an input waveguide through which an optical signal is input, an output waveguide through which an optical signal is output, a first connection unit connected to the input waveguide and the output waveguide, a second connection unit configured to split the optical signal input through the input waveguide to a plurality of split waveguides and to combine optical signals reflected by a plurality of reflection units connected to the plurality of split waveguides to produce a combined signal, a connection waveguide connecting the first connection unit with the second connection unit, and a phase modulation unit that modulates a refractive index of at least one of the plurality of split waveguides to modulate a phase of an optical signal passing through the at least one of the plurality of split waveguides.

In certain embodiments, in the second connection unit, the optical signals reflected by the plurality of reflection units are combined such that constructive interference or destructive interference occurs according to respective phases of the reflected optical signals.

In certain embodiments, the first connection unit splits the combined signal output by the second connection unit.

In certain embodiments, the input waveguide comprises an isolator for transmitting an optical signal to block a signal corresponding to the combined signal.

In certain embodiments, the first connection unit is a circulator for allowing the combined signal to be output through the output waveguide.

In certain embodiments, the phase modulation unit has a straight-line-type structure.

In certain embodiments, the phase modulation unit has a ring-resonant-type structure.

In certain embodiments, the phase modulation unit has a hybrid structure in which the straight-line-type structure and the ring-resonant-type structure are combined.

According to another embodiment of the inventive concept, a modulator comprises a bulk-silicon substrate comprising a trench having a predetermined width and a predetermined depth, a bottom cladding layer formed in the trench of the bulk-silicon substrate, a plurality of waveguides formed on the bottom cladding layer, a phase modulation unit formed on the bottom cladding layer and configured to modulate a phase of an optical signal passing through a waveguide by modulating a refractive index of the waveguide, and a top cladding layer formed on the plurality of waveguides and the phase modulation unit. The plurality of waveguides comprises an input waveguide through which an optical signal is input, an output waveguide through which an optical signal is output, a first connection unit connected to the input waveguide and the output waveguide, a connection waveguide connecting the first connection unit with the second connection unit, and a second connection unit that splits the optical signal input through the input waveguide to a plurality of split waveguides and combines optical signals reflected by a plurality of reflection units. The phase modulation unit modulates a refractive index of at least one of the plurality of split waveguides to modulate a phase of an optical signal passing through the at least one of the split waveguides.

In certain embodiments, the phase modulation unit further comprises a plurality of reflection units positioned at respective ends of the plurality of split waveguides to reflect the optical signal split by the second connection unit.

In certain embodiments, the phase modulation unit has a straight-line-type structure.

BRIEF DESCRIPTION OF THE DRAWINGS

The drawings illustrate selected embodiments of the inventive concept. In the drawings, like reference numbers indicate like features.

DETAILED DESCRIPTION OF EMBODIMENTS

Embodiments of the inventive concept are described below with reference to the accompanying drawings. These embodiments are presented as teaching examples and should not be construed to limit the scope of the inventive concept.

In the description that follows, the terms "first", "second", etc., are used to describe various features, but the features should not be limited by these terms. Rather, these terms are used merely to distinguish one feature from another.

Where a feature is referred to as being "connected" to another feature, the features may be directly connected or intervening features may be present. On the other hand, where a feature is described as being "directly connected" to another feature, no intervening features are present. Other expressions for describing relationships between features should be interpreted in a similar manner.

The terms used in this description are intended to describe specific embodiments, and are not intended to limit the inventive concept. Terms in a singular form are intended to encompass plural forms unless the context clearly indicates otherwise.

Figure 1A:
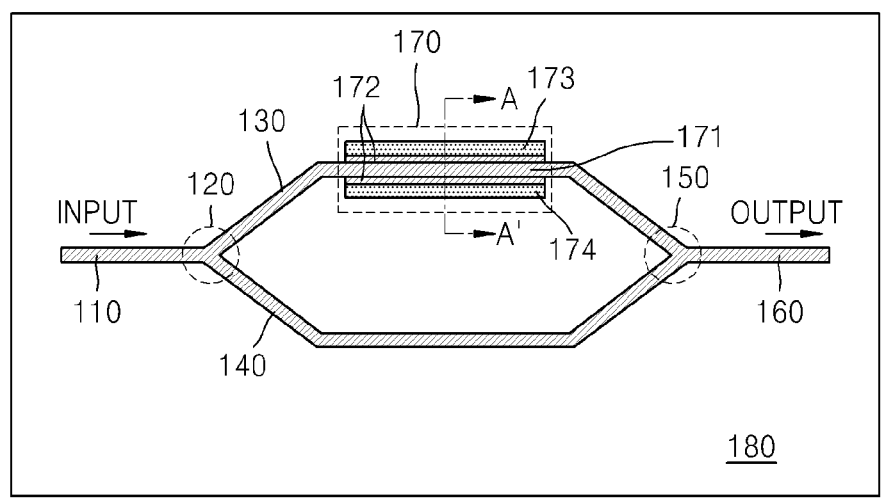
FIG. 1A is diagram illustrating an interferometer-type optical modulator.
Figure 1B:
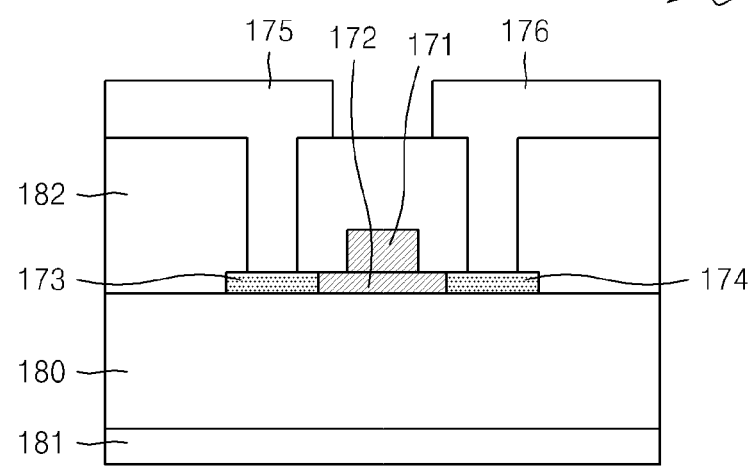
FIG. 1B is a cross-sectional view taken along a line A-A' in FIG. 1A.

FIG. 1A is a diagram illustrating an interferometer-type optical modulator 100, and FIG. 1B is a cross-sectional view taken along a line A-A' in FIG. 1A.

Referring to FIG. 1A interferometer-type optical modulator 100 comprises an input waveguide 110, a first connection unit 120, a first waveguide 130, a second waveguide 140, a second connection unit 150, an output waveguide 160, and a straight-line-type phase modulation unit 170.

Referring to FIG. 1, an optical signal is input through input waveguide 110, and the input optical signal is split to first waveguide 130 and second waveguide 140 in first connection unit 120. Straight-line-type phase modulation unit 170 modulates the phase of the optical signal in first waveguide 130. However, the phase of the optical signal in second waveguide 140 is not changed. The optical signals passing through first waveguide 130 and second waveguide 140 are combined and analyzed in second connection unit 150 using an interferometer such as a Mach-Zehnder interferometer. The optical signals that are combined in second connection unit 150 are output through output waveguide 160.

Where a difference between the phase of the optical signal produced by straight-line-type phase modulation unit 170 and the phase of the optical signal of second waveguide 140 is 180 degrees, destructive interference occurs in second connection unit 150 and the strength of the optical signal output through output waveguide 160 goes to 0. On the other hand, where the phase of the optical signal produced by straight-line-type phase modulation unit 170 and the phase of the optical signal split to second waveguide 140 are the same, constructive interference occurs in second connection unit 150 and thus the strength of the optical signal output through output waveguide 160 goes to 1.

Input waveguide 110, first waveguide 130, second waveguide 140, output waveguide 160, first connection unit 120, second connection unit 150, and straight-line-type phase modulation unit 170 of FIG. 1A can be formed on an SOI substrate. The waveguides are generally manufactured by forming a high refractive index silicon core surrounded by a low refractive index insulator, such as silicon dioxide ($SiO_2$).

Referring to FIG. 1B, input waveguide 110, first waveguide 130, second waveguide 140, output waveguide 160, first connection unit 120, second connection unit 150, and straight-line-type phase modulation unit 170 all are formed on a bottom cladding layer 180 having a low refractive index. Bottom cladding layer 180 is formed on a silicon substrate 181, and silicon substrate 181 is formed on an SOI substrate.

Straight-line-type phase modulation unit 170 can be formed in various ways, such as injecting electric charges into a waveguide. Once electric charges are injected into a waveguide, the refractive index of the waveguide decreases, changing the phase of light passing through the waveguide.

The waveguide in straight-line-type phase modulation unit 170 comprises a core 171 and a slab 172. Slab 172 is formed as a silicon layer on bottom cladding layer 180, and core 171 is formed to a predetermined height on a portion of slab 172. Slab 172 is thin enough not to affect the wave-guiding characteristics of the waveguide.

Straight-line-type phase modulation unit 170 comprises a first electrode 175 for injecting a P-type carrier, and a second electrode 176 for injecting an N-type carrier. Straight-line-type phase modulation unit 170 further comprises a P-type carrier doping unit 173 and an N-type carrier doping unit 174. P-type carrier doping unit 173 is connected to first electrode 175 and is formed on slab 172 for doping with the P-type carrier. N-type carrier doping unit 174 is connected to second electrode 176 and is formed on slab 172 for doping with the N-type carrier.

A top cladding layer 182 is formed on top of input waveguide 110, first waveguide 130, second waveguide 140, output waveguide 160, first connection unit 120, second connection unit 150, and straight-line-type phase modulation unit 170.

In interferometer-type optical modulator 100, light passes through straight-line-type phase modulation unit 170 once, so a phase modulation unit having a length of several millimeters is required for sufficient phase modulation. Interferometer-type optical modulator 100 is capable of operating at high speed, has a broad operating spectrum band, and is relatively insensitive to temperature change. However, interferometer-type optical modulator 100 is relatively large, which can prevent electronic devices from being miniaturized.

Figure 2:
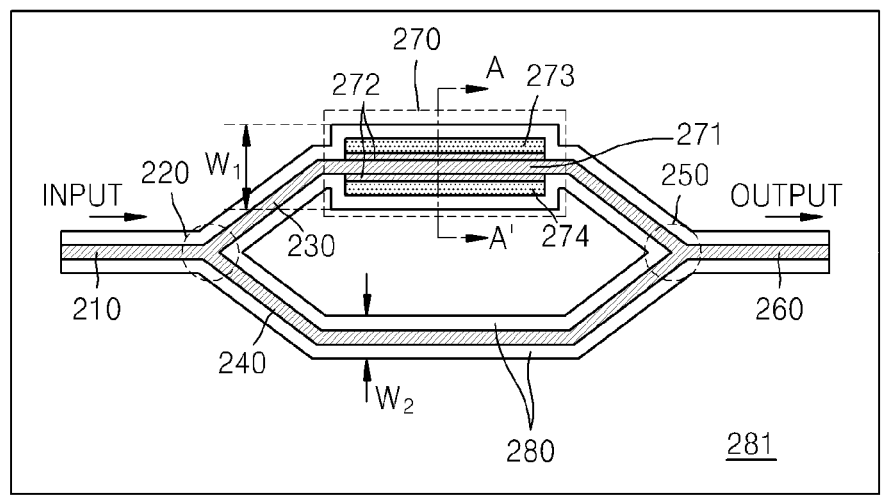
FIG. 2 is a diagram illustrating an optical modulator formed on a bulk-silicon (Si) substrate.

FIG. 2 illustrates an interferometer-type optical modulator 200 formed on a bulk-Si substrate. An optical signal is input through an input waveguide 210, and the input optical signal is split to a first waveguide 230 and a second waveguide 240 in a first connection unit 220. A straight-line-type phase modulation unit 270 modulates the phase of the optical signal of first waveguide 230. The phase of optical signal in second waveguide 240 is not changed. The optical signals passing through first waveguide 230 and second waveguide 240 are combined and analyzed in a second connection unit 250 using an interferometer such as a Mach-Zehnder interferometer.

Input waveguide 210, first waveguide 230, second waveguide 240, an output waveguide 260, first connection unit 220, second connection unit 250, and straight-line-type phase modulation unit 270 can be formed on a bulk-Si substrate 281.

Because bulk-Si substrate 281 has no buried oxide, a bottom cladding layer 280 is formed in a trench on bulk-SI substrate 281. The trench is formed in bulk-Si substrate 281 and then filled with an insulator, such as $SiO_2$, to form bottom cladding layer 280. The shape of the trench is compatible with the shapes of input waveguide 210, first waveguide 230, second waveguide 240, and output waveguide 260, and the width of the trench is large enough to surround a core 271 with $SiO_2$.

Bottom cladding layer 280 is formed in the trench formed in bulk-Si substrate 281, and then a silicon layer is formed on bottom cladding layer 280. The silicon layer is then processed to form input waveguide 210, first waveguide 230, second waveguide 240, output waveguide 260, first connection unit 220, second connection unit 250, and straight-line-type phase modulation unit 270. Thereafter, a top cladding layer 282 is formed of an insulator such as $SiO_2$.

In interferometer-type optical modulator 200 of FIG. 2, the trench of bulk-Si substrate 281 is substituted for the BOX portion of the SOI substrate of FIG. 1. Bottom cladding layer 180 of FIG. 1 is formed even on unnecessary portions of silicon substrate 181, but bottom cladding layer 280 of FIG. 2 is formed on necessary portions such as input waveguide 210, first waveguide 230, second waveguide 240, output waveguide 260, first connection unit 220, second connection unit 250, and straight-line-type phase modulation unit 270.

In certain embodiments, a width $W_1$ of bottom cladding layer 280 formed under straight-line-type phase modulation unit 270 is within a range of about 1.5 μm to 10.0 μm, and a width $W_2$ of bottom cladding layer 280 formed under input waveguide 210, first waveguide 230, second waveguide 240, and output waveguide 260 is within a range of about 1.0 μm to 10.0 μm.

Figure 3A:
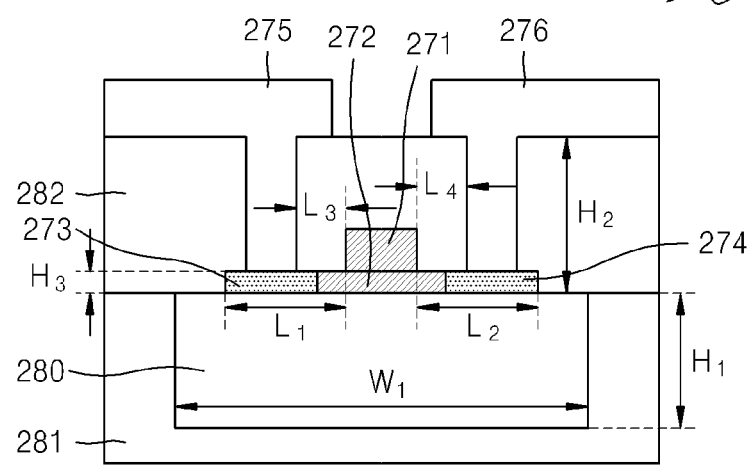
FIGS. 3A, 3B, and 3C are cross-sectional views taken along a line A-A' in FIG. 2 to illustrate an optical modulator formed on a bulk-Si substrate according to an embodiment of the inventive concept.
Figure 3B:
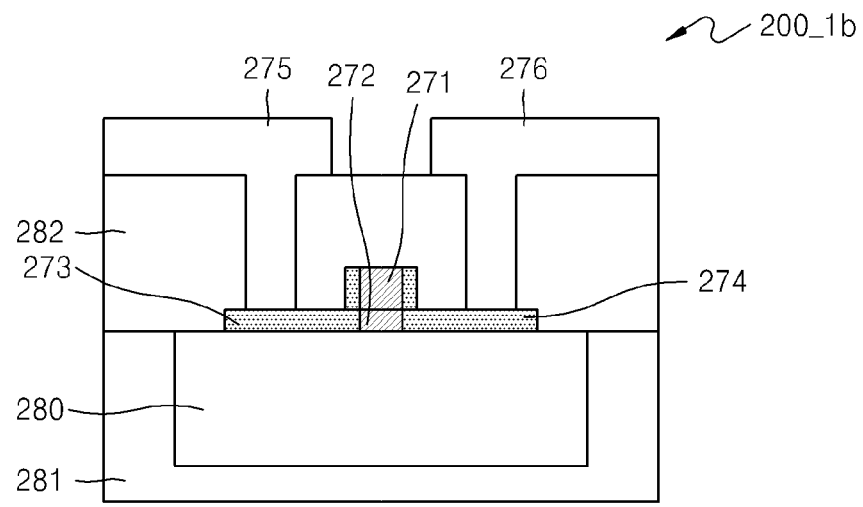
Figure 3C:
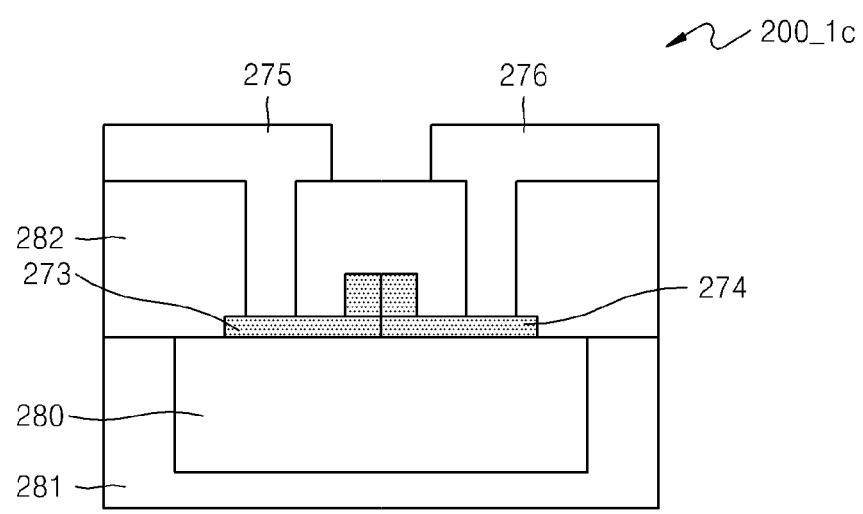

FIGS. 3A, 3B, and 3C are cross-sectional views taken along a line A-A' in FIG. 2 to illustrate an optical modulator formed on a bulk-Si substrate according to an embodiment of the inventive concept.

Referring to FIGS. 2 and 3A, an optical modulator 200_1A formed on a bulk-Si substrate comprises bulk-Si substrate 281, bottom cladding layer 280, waveguides 210, 230, 240, and 260, straight-line-type phase modulation unit 270, and top cladding layer 282.

Bulk-Si substrate 281 comprises a trench that is etched to a predetermined depth and a predetermined width. Bottom cladding layer 280 is formed in the trench of bulk-Si substrate 281, and waveguides 210, 230, 240, and 260 of FIG. 2 are formed on bottom cladding layer 280.

Straight-line-type phase modulation unit 270 is formed on bottom cladding layer 280 and modulates a refractive index of a waveguide to modulate a phase of an optical signal passing through the waveguide. In particular, in FIGS. 2 and 3A, straight-line-type phase modulation unit 270 modulates a phase of an optical signal passing through first waveguide 230. Top cladding layer 282 is formed on waveguides 210, 230, 240, and 260, and straight-line-type phase modulation unit 270.

In optical modulator 200_1A of FIG. 3A, a thickness $H_1$ of bottom cladding layer 280 is equal to a depth of the trench of bulk-Si substrate 281. In certain embodiments, thickness $H_1$ of bottom cladding layer 280 and a thickness $H_2$ of top cladding layer 282 are both within a range of 0.5 μm to 3.0 μm.

The waveguide going through the straight-line-type phase modulation unit 270 comprises core 271 and a slab 272. Slab 272 is formed of a silicon layer on bottom cladding layer 280, and core 271 is formed to a predetermined height on a portion of slab 272. Slab 272 is thin enough not to affect waveguiding characteristics of the waveguide, and a thickness $H_3$ of slab 272 is within a range of 10 nm to 100 nm. In certain embodiments, horizontal lengths $L_1$ and $L_2$ from the surface of core 271 to the end of slab 272 are within a range of 1.0 μm to 5.0 μm.

Straight-line-type phase modulation unit 270 comprises a first electrode 275 for injecting a P-type carrier and a second electrode 276 for injecting an N-type carrier. In certain embodiments, horizontal lengths $L_3$ and $L_4$ from the surface of core 271 to first electrode 275 and second electrode 276 are within a range of 0.5 μm to 3.0 μm.

Straight-line-type phase modulation unit 270 comprises a P-type carrier doping unit 273 and an N-type carrier doping unit 274. P-type carrier doping unit 273 is connected to first electrode 275 and is formed on slab 272 for doping with the P-type carrier. N-type carrier doping unit 274 is connected to second electrode 276 and is formed on slab 272 for doping with the N-type carrier.

Doping densities of the P-type carrier and the N-type carrier typically fall within a range of 10E-17 to 10E-22. P-type carrier doping unit 273 and N-type carrier doping unit 274 are typically formed symmetrically with respect to core 271, and are formed on a portion of slab 272.

Referring to FIGS. 3B and 3C, most components of an optical modulator 200_1B of FIG. 3B and an optical modulator 200_1C of FIG. 3C are the same as those of optical modulator 200_1A of FIG. 3A except for regions where the P-type carrier and the N-type carrier are doped.

While P-type carrier doping unit 273 and N-type carrier doping unit 274 are formed on a portion of the edge of slab 272 in optical modulator 200_1A of FIG. 3A, P-type carrier doping unit 273 and N-type carrier doping unit 274 are formed on both a portion of slab 272 and a portion of core 271 in optical modulator 200_1B of FIG. 3B, and P-type carrier doping unit 273 and N-type carrier doping unit 274 are formed on both the entire area of slab 272 and the entire area of core 271 in optical modulator 200_1C of FIG. 3C.

Figure 4A:
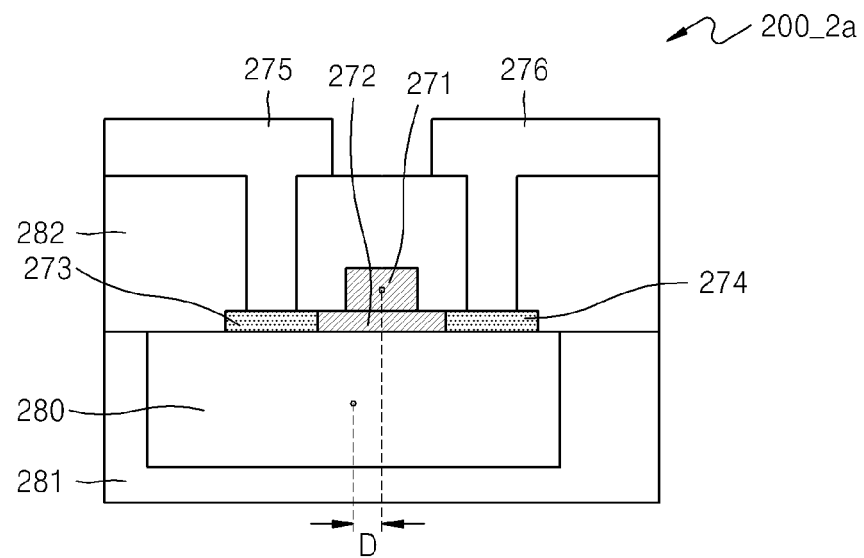
FIGS. 4A, 4B, and 4C are cross-sectional views taken along line A-A' in FIG. 2 to illustrate an optical modulator formed on a bulk-Si substrate according to another embodiment of the inventive concept.
Figure 4B:
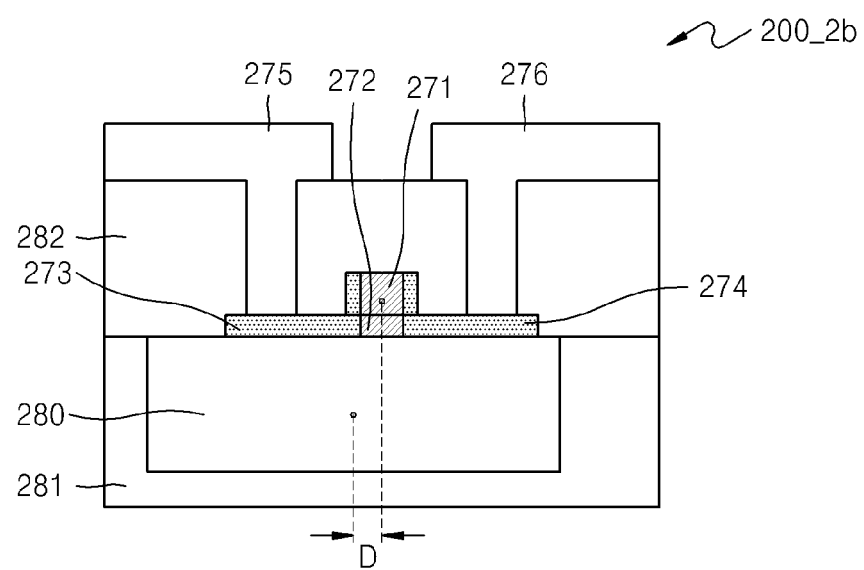
Figure 4C:
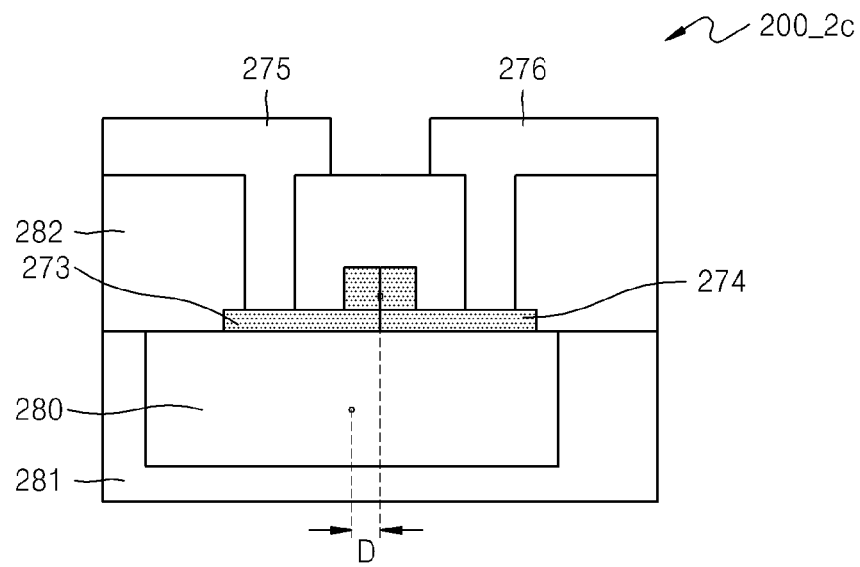

FIGS. 4A, 4B, and 4C are cross-sectional views taken along line A-A' in FIG. 2 to illustrate an optical modulator formed on a bulk-Si substrate according to another embodiment of the inventive concept.

Referring to FIGS. 4A, 4B, and 4C, most components of optical modulators 200_2A, 200_2B, and 200_2C formed on a bulk-Si substrate are the same as those of optical modulators 200_1A, 200_1B, and 200_1C of FIGS. 3A, 3B, and 3C except that the center of straight-line-type phase modulation unit 270 (or the center of core 271) and the center of bottom cladding layer 280 formed under straight-line-type phase modulation unit 270 may have a predetermined horizontal position difference D therebetween, unlike in optical modulators 200_1A, 200_1B, and 200_1C of FIGS. 3A, 3B, and 3C.

The horizontal position difference D between the center of straight-line-type phase modulation unit 270 and the center of bottom cladding layer 280 formed under straight-line-type phase modulation unit 270 typically falls within a range of about 0.1 μm to 5.0 μm.

Figure 5A:
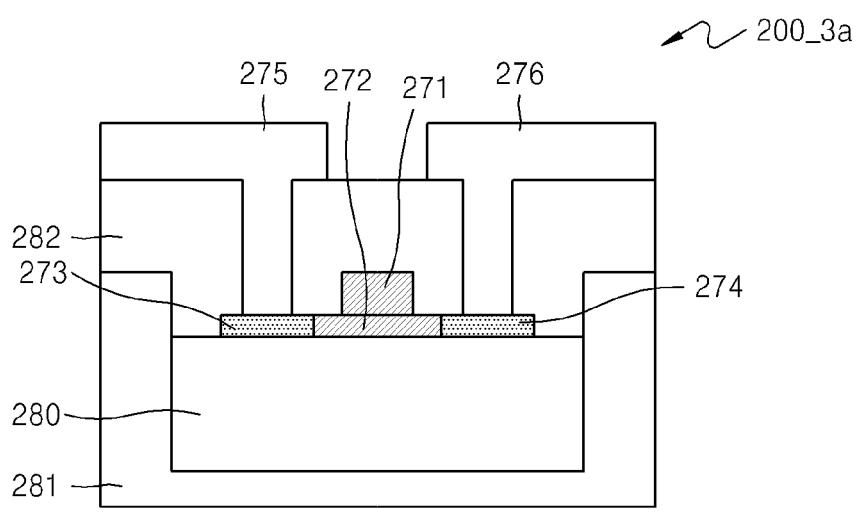
FIGS. 5A, 5B, and 5C are cross-sectional views taken along line A-A' in FIG. 2 to illustrate an optical modulator formed on a bulk-Si substrate according to still another embodiment of the inventive concept.
Figure 5B:
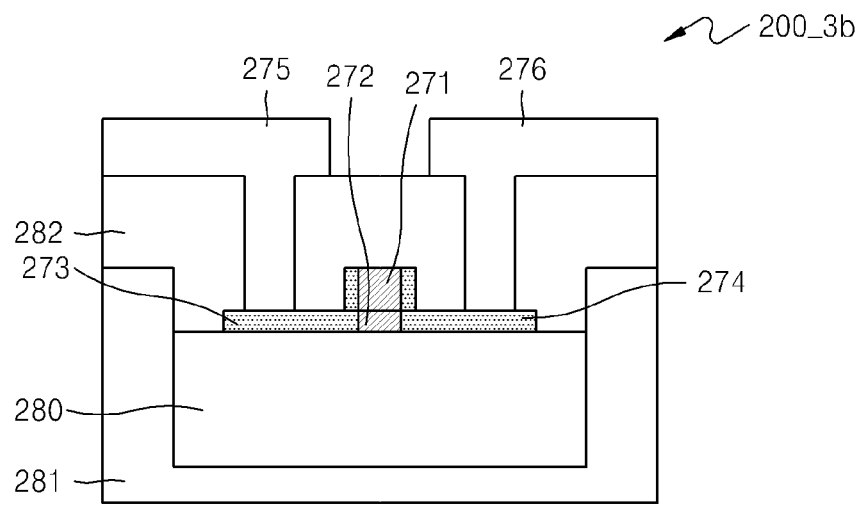
Figure 5C:
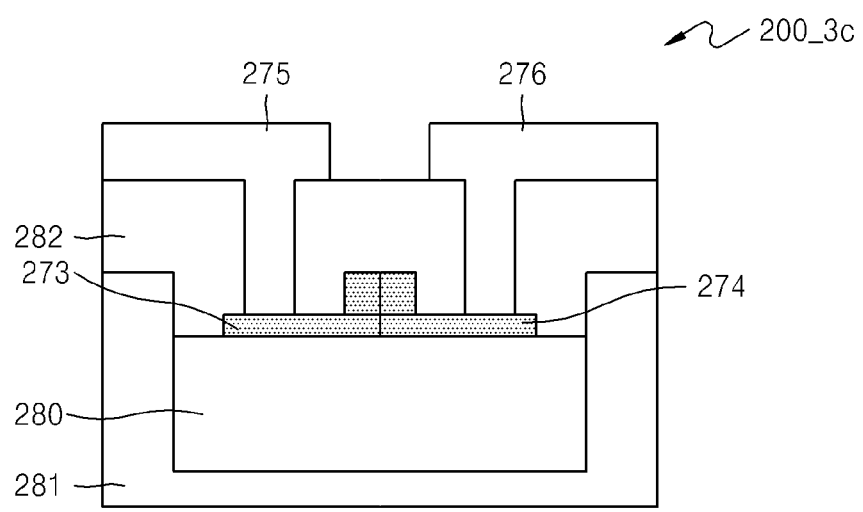

FIGS. 5A, 5B, and 5C are cross-sectional views taken along line A-A' in FIG. 2 to illustrate an optical modulator formed on a bulk-Si substrate according to another embodiment of the inventive concept.

Referring to FIGS. 5A, 5B, and 5C, most components of optical modulators 200_3A, 200_3B, and 200_3C formed on a bulk-Si substrate are the same as those of optical modulators 200_1A, 200_1B, and 200_1C of FIGS. 3A, 3B, and 3C except that the thickness of bottom cladding layer 280 is smaller than the depth of the trench of bulk-Si substrate 281, unlike in optical modulators 200_1A, 200_1B, and 200_1C of FIGS. 3A, 3B, and 3C.

Optical modulators 200_3A, 200_3B, and 200_3C are structured such that a top end of the edge of bulk-Si substrate 281 coincides with a top end of core 271. Such structures are obtained by forming the trench to a deeper depth in bulk-Si substrate 281, forming bottom cladding layer 280 to a proper height, forming a silicon layer on the remaining portion of bulk-Si substrate 281, and processing the silicon layer to form waveguides 210, 230, 240, and 260 and straight-line-type phase modulation unit 270.

Figure 6:
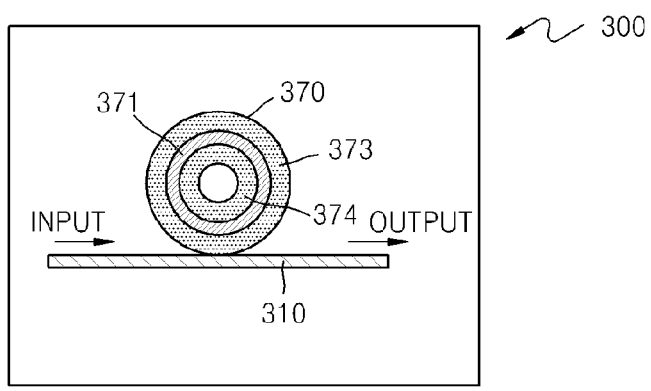
FIG. 6 is a diagram illustrating a resonant-type optical modulator.

FIG. 6 is a diagram illustrating a resonant-type optical modulator 300. Where resonance conditions are satisfied, an optical signal guided along a straight-line waveguide 310 is moved to a ring waveguide 371 in a ring-resonant-type phase modulation unit 370 and experiences loss while being continuously guided within ring waveguide 371. Ring-resonant-type phase modulation unit 370 modulates a refractive index of ring waveguide 371 to modulate the resonance conditions and the strength of the optical signal.

Ring waveguide 371 typically comprises a core and a slab (not shown) similar to that of FIGS. 1A and 1B. Ring-resonant-type phase modulation unit 370 comprises a P-type carrier doping unit 373 formed on the slab to dope a P-type carrier and an N-type carrier doping unit 374 formed on the slab to dope an N-type carrier.

In resonant-type optical modulator 300, an optical signal passes through ring-resonant-type phase modulation unit 370 several times, so the length (or diameter) of ring-resonant-type phase modulation unit 370 required to obtain sufficient phase modulation is relatively short. However, resonant-type optical modulator 300 operates as an optical modulator when the resonance conditions are satisfied, resulting in a narrow modulation spectrum band.

Figure 7:
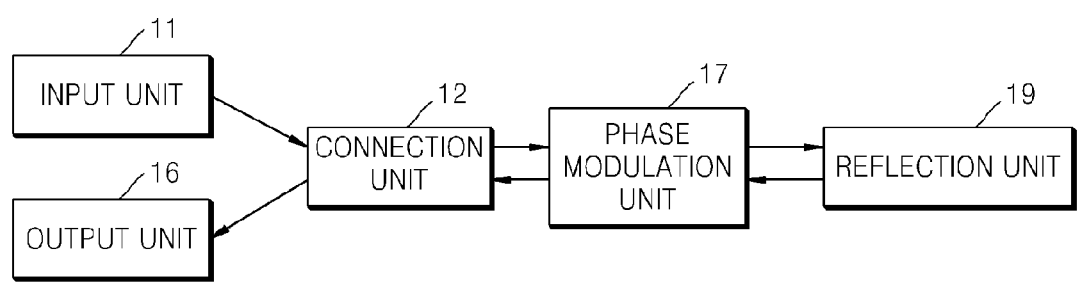
FIG. 7 is a block diagram of an optical modulator according to an embodiment of the inventive concept.

FIG. 7 is a block diagram of an optical modulator according to an embodiment of the inventive concept.

The optical modulator of FIG. 7 comprises an input unit 11, a connection unit 12, a phase modulation unit 17, a reflection unit 19, and an output unit 16. An optical signal is provided to input unit 11, after passing through connection unit 12, and is then phase-modulated by phase modulation unit 17.

The phase-modulated optical signal is reflected by reflection unit 19 and passes through phase modulation unit 17 again. Consequently, the optical signal undergoes phase modulation twice. In this structure, because the optical signal passes through phase modulation unit 17 twice, the length of phase modulation unit 17 necessary for phase modulation is reduced to ½, reducing the size of the optical modulator.

Figure 8A:
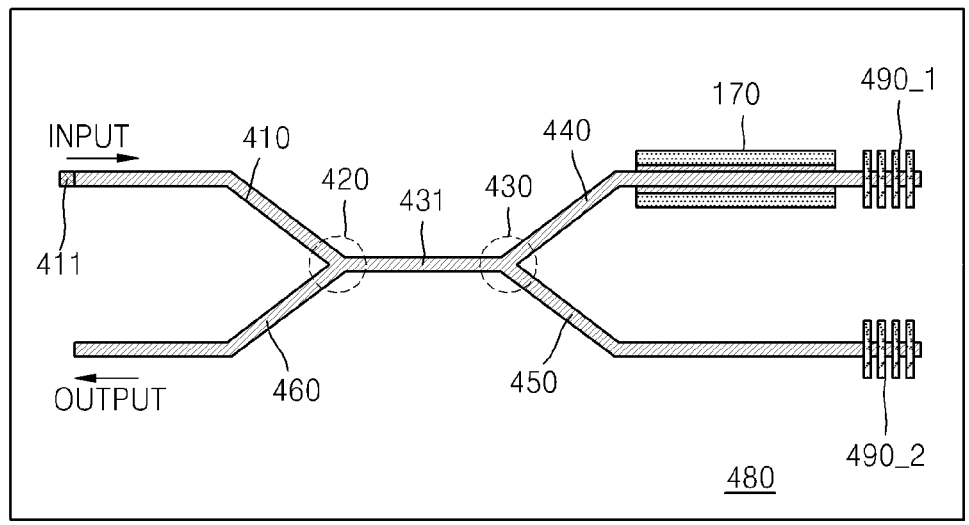
FIG. 8A is a diagram illustrating an optical modulator comprising a straight-line-type phase modulation unit according to an embodiment of the inventive concept.
Figure 8B:
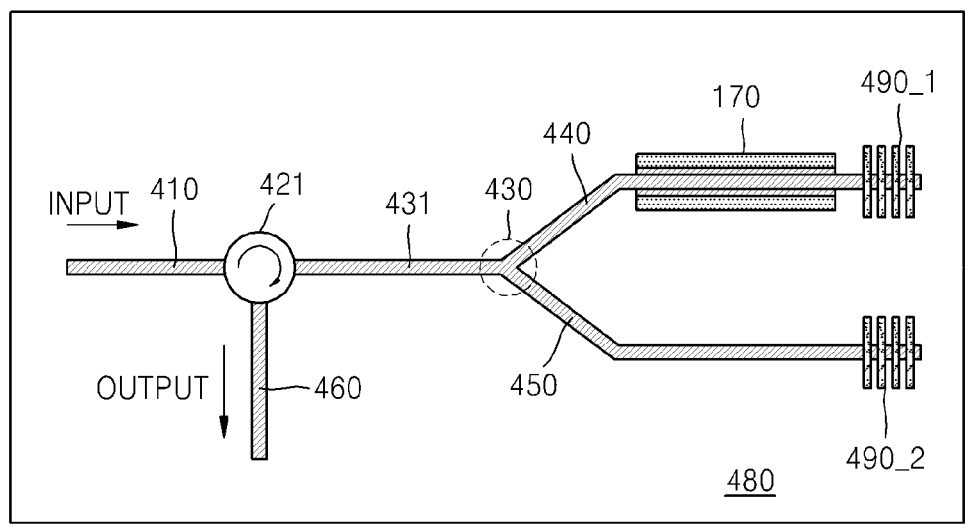
FIG. 8B is a diagram illustrating a circulator operating as a first connection unit in the optical modulator of FIG. 8A.

FIG. 8A is a diagram illustrating an optical modulator 400_1 comprising a straight-line-type phase modulation unit according to an embodiment of the inventive concept, and FIG. 8B is a diagram illustrating a circulator operating as a first connection unit in optical modulator 400_1.

Referring to FIG. 8A, optical modulator 400_1 comprises an input waveguide 410, a first connection unit 420, a second connection unit 430, a connection waveguide 431, a plurality of split waveguides 440 and 450, straight-line-type phase modulation unit 170, a plurality of reflection units 490_1 and 490_2, and an output waveguide 460.

An optical signal is input through input waveguide 410, and the input optical signal passes through first connection unit 420 and output waveguide 460, and is split into split waveguides 440 and 450 in second connection unit 430 connected to first connection unit 420 by connection waveguide 431.

Second connection unit 430 splits the optical signal input through input waveguide 410 into split waveguides 440 and 450, and combines optical signals reflected by reflection units 490_1 and 490_2. Split waveguides 440 and 450 receive the optical signals split in second connection unit 430. Although two split waveguides are shown in FIG. 8A, three or more split waveguides can be connected to second connection unit 430.

Straight-line-type phase modulation unit 170 modulates a refractive index of split waveguide 440 to modulate a phase of the optical signal passing through split waveguide 440.

Reflection units 490_1 and 490_2 are positioned at respective ends of split waveguides 440 and 450, and they reflect the optical signals of respective split waveguides 440 and 450. Two reflection units are shown in FIG. 8A. However, where three or more split waveguides are connected to second connection unit 430, three or more reflection units can exist on respective ends of the three or more split waveguides.

Second connection unit 430 combines the optical signals reflected by reflection units 490_1 and 490_2. More specifically, the optical signal of split waveguide 440 is phase-modulated by straight-line-type phase modulation unit 170, and the phase-modulated optical signal, after being reflected by reflection unit 490_1, returns to straight-line-type phase modulation unit 170 and is phase-modulated again, and then arrives in second connection unit 430.

On the other hand, the optical signal of split waveguide 450 is reflected by reflection unit 490_2 without being phase-modulated and returns to second connection unit 430.

The optical signal reflected by reflection unit 490_1 and phase-modulated in straight-line-type phase modulation unit 170 is combined in second connection unit 430 with the optical signal reflected by reflection unit 490_2. These signals are typically combined using an interferometer such as a Mach-Zehnder interferometer.

The combined optical signal produced by second connection unit 430 can have a strength of 1 upon undergoing constructive interference or a strength of 0 upon undergoing destructive interference. The optical signal undergoing constructive interference or destructive interference in second connection unit 430 is output through output waveguide 460. More specifically, the combined optical signal undergoes constructive interference or destructive interference in second connection unit 430 and travels to first connection unit 420 through connection waveguide 431. First connection unit 420 then splits the combined optical signal to output waveguide 460 and input waveguide 410. An isolator 411 or another signal cancellation mechanism can cancel the optical signal output through input waveguide 410. Isolator 411 transmits an optical signal input from an external source through input waveguide 410 and blocks the combined optical signal produced by the second connection unit 430.

Optical modulator 400_1 proposed in FIG. 8A has an additional loss of 3 dB when compared to interferometer-type optical modulator 100 of FIG. 1A. In optical modulator 400_1 of FIG. 8A, however, an optical signal passes through straight-line-type phase modulation unit 170 twice and thus the length of phase modulation unit 170 required for sufficient phase modulation is reduced to ½ in comparison with interferometer-type optical modulator 100 of FIG. 1A, enabling miniaturization of a device incorporating optical modulator 400_1.

Waveguides 410, 431, 440, 450, and 460, connection units 420 and 430, and straight-line-type phase modulation unit 170 of FIG. 8A may be implemented on an SOI substrate. In certain embodiments, the SOI substrate comprises a bottom silicon substrate (not shown in FIG. 8A) and a bottom cladding layer 480 formed as an insulator on the bottom silicon substrate.

Straight-line-type phase modulation unit 170 used in FIG. 8A has the same structure as described in FIGS. 1A and 1B, and so it will not be described in detail.

Referring to FIG. 8B, an optical modulator 400_2 has a structure similar to optical modulator 400_1 of FIG. 8A, except that a circulator 421 is used in place of first connection unit 420 of FIG. 8A.

Circulator 421 allows the combined optical signal produced in second connection unit 430 to be output through output waveguide 460. More specifically, the optical signal input into input waveguide 410 passes through circulator 421. The optical signal passing through circulator 421 passes through second connection unit 430 along connection waveguide 431 and is transferred to split waveguides 490_1 and 490_2.

The optical signals transferred to split waveguides 490_1 and 490_2 are coupled in second connection unit 430 in the same manner as in optical modulator 400_1 of FIG. 8A. The composite optical signal produced by the coupling in second connection unit 430 is output through output waveguide 460 through circulator 421.

Unlike optical modulator 400_1 of FIG. 8A, in optical modulator 400_2 of FIG. 8B, the optical signal is not output through input waveguide 410, thus avoiding a loss of 3 dB and removing a need to incorporate an isolator in input waveguide 410. Therefore, in optical modulator 400_2 of FIG. 8B, further losses do not occur in addition to an insertion loss of circulator 421.

Figure 8C:
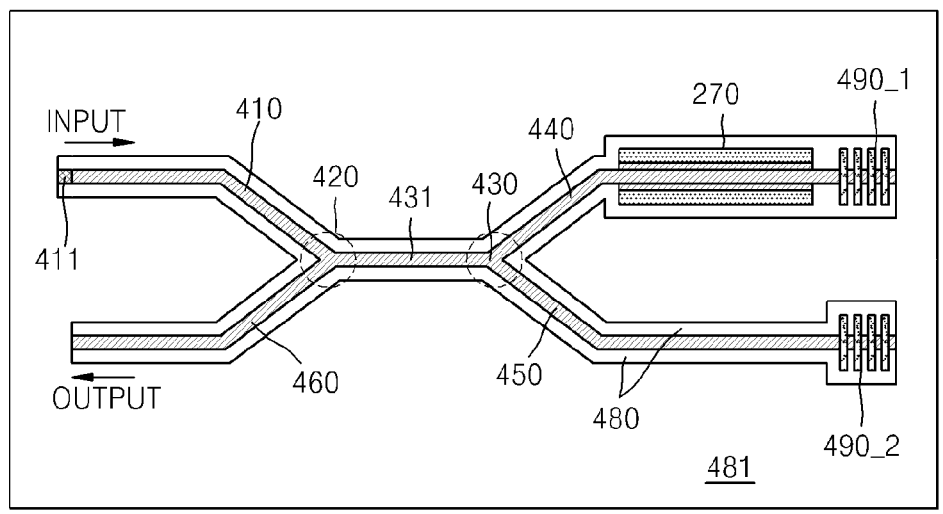
FIGS. 8C and 8D are diagrams illustrating the optical modulators of FIGS. 8A and 8B formed on a bulk-Si substrate.
Figure 8D:
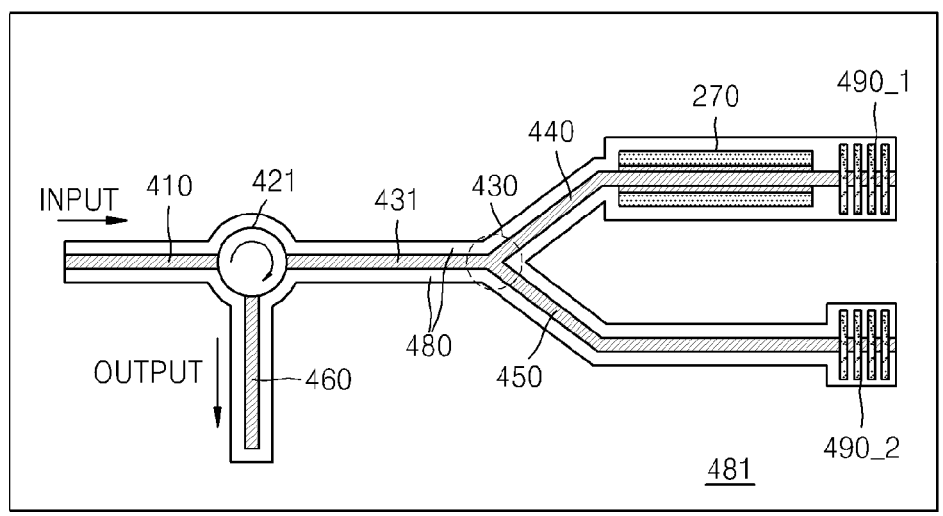

FIGS. 8C and 8D are diagrams illustrating the optical modulators of FIGS. 8A and 8B formed on a bulk-Si substrate. The optical modulators of FIGS. 8C and 8D are optical modulators 400_3 and 400_4 formed on a bulk-Si substrate.

In the optical modulators of FIGS. 8C and 8D, the bulk-Si substrate described with reference to FIGS. 2 through 5C is applied to optical modulators 400_1 and 400_2 of FIGS. 8A and 8B. More specifically, bulk-Si substrate 481 used in optical modulators 400_3 and 400_4 of FIGS. 8C and 8D comprises a trench etched to have a predetermined width and a predetermined depth. Bottom cladding layer 480 is formed in the trench of bulk-Si substrate 481, and waveguides 410, 430, 440, and 460, straight-line-type phase modulation unit 270, and reflection units 490_1 and 490_2 are formed on bottom cladding layer 480.

FIGS. 9 through 15 illustrate various optical modulator structures having components similar to those of the optical modulators of FIGS. 8A, 8B, 8C, and 8D, but with various alternative phase modulation units. In the following description, components other than the phase modulation unit will not be described because they have already been described with reference to FIGS. 8A, 8B, 8C, and 8D.

Figure 9A:
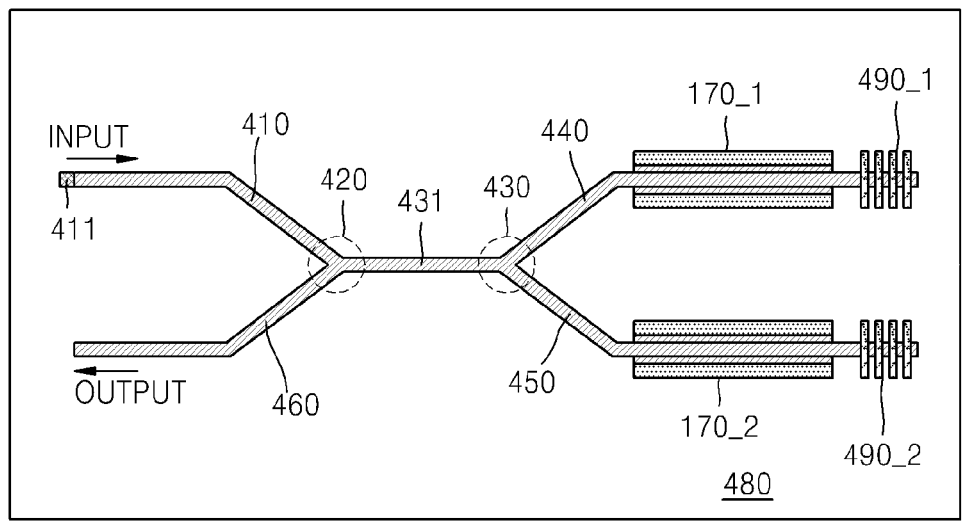
FIG. 9A is a diagram illustrating an optical modulator comprising a straight-line-type phase modulation unit according to another embodiment of the inventive concept.
Figure 9B:
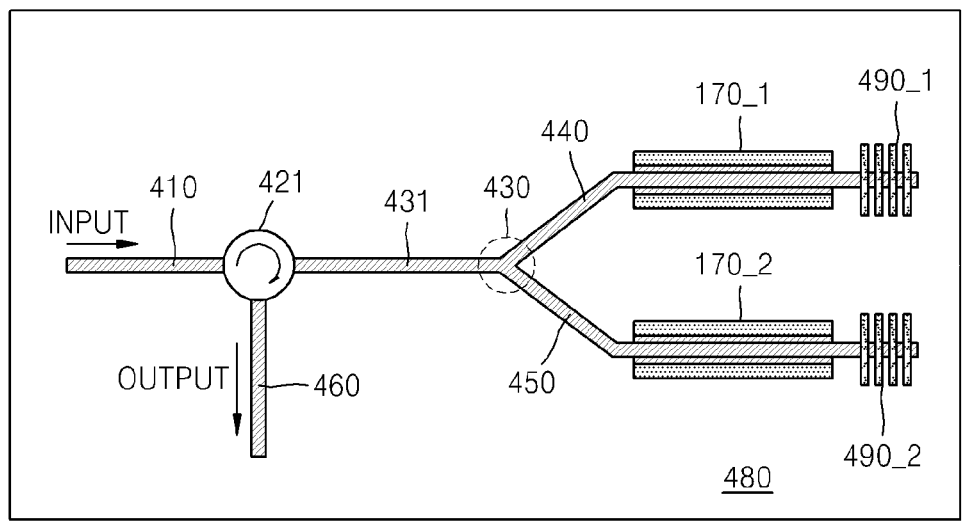
FIG. 9B is a diagram illustrating a circulator operating as a first connection unit in the optical modulator of FIG. 9A.

FIG. 9A is a diagram illustrating an optical modulator comprising a straight-line-type phase modulation unit according to another embodiment of the inventive concept, and FIG. 9B is a diagram illustrating a circulator operating as a first connection unit in the optical modulator of FIG. 9A.

Unlike optical modulators 400_1 and 400_2 of FIGS. 8A and 8B where straight-line-type phase modulation unit 170 is formed on one of split waveguides 440 and 450, for example, split waveguide 440, optical modulators 500_1 and 500_2 of FIGS. 9A and 9B have straight-line-type phase modulation units 270_1 and 270_2 formed on all of split waveguides 440 and 450, respectively.

Figure 9C:
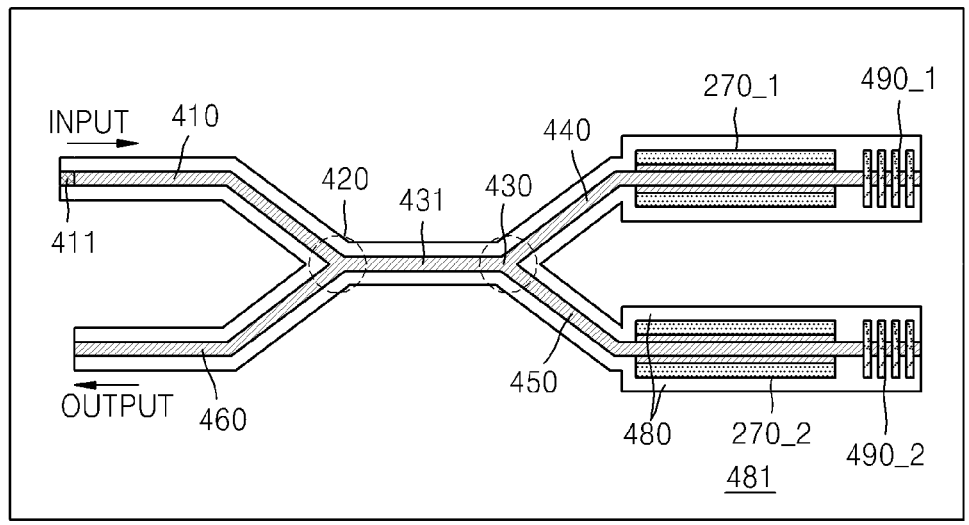
FIGS. 9C and 9D are diagrams illustrating the optical modulators of FIGS. 9A and 9B formed on a bulk-Si substrate.
Figure 9D:
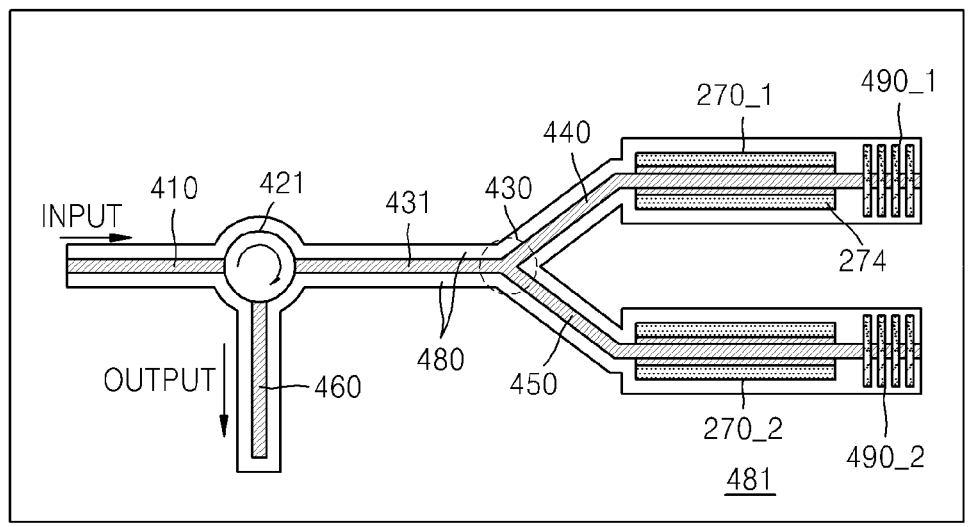

FIGS. 9C and 9D are diagrams illustrating the optical modulators of FIGS. 9A and 9B formed on a bulk-Si substrate.

The optical modulators of FIGS. 9C and 9D are optical modulators 500_3 and 500_4 formed on a bulk-Si substrate. In the optical modulators of FIGS. 9C and 9D, the bulk-Si substrate described with reference to FIGS. 2 through 5C is applied to optical modulators 500_1 and 500_2 of FIGS. 9A and 9B. More specifically, bulk-Si substrate 481 used in optical modulators 500_3 and 500_4 of FIGS. 9C and 9D comprises a trench that is etched to a predetermined width and a predetermined depth. Bottom cladding layer 480 is formed in the trench of bulk-Si substrate 481, and waveguides 410, 430, 440, and 460, the straight-line-type phase modulation units 270_1 and 270_2, and reflection units 490_1 and 490_2 are formed on bottom cladding layer 480.

Figure 10A:
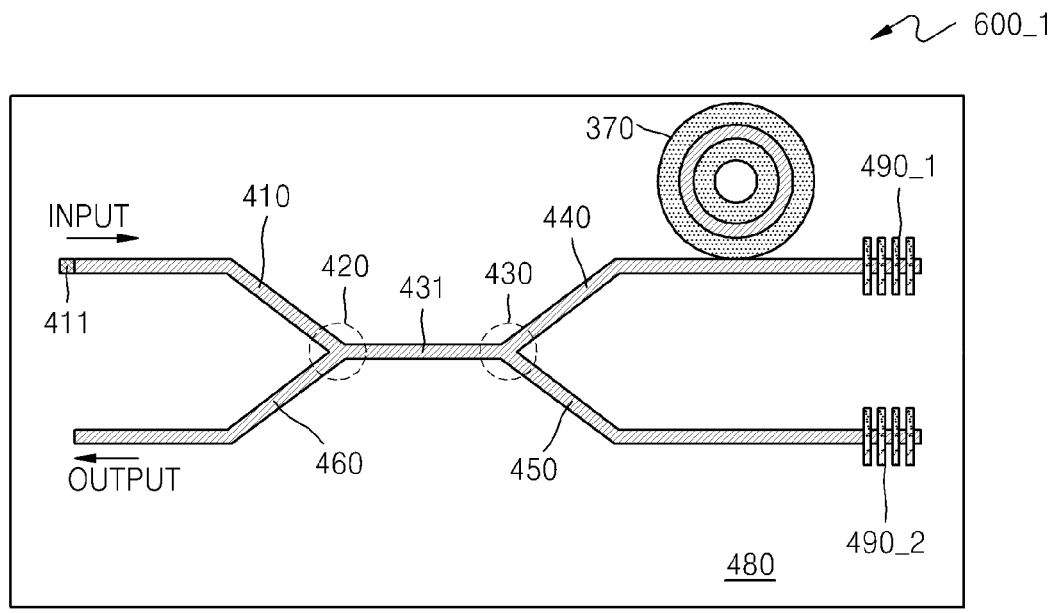
FIG. 10A is a diagram illustrating an optical modulator comprising a ring-resonant-type phase modulation unit according to an embodiment of the inventive concept.
Figure 10B:
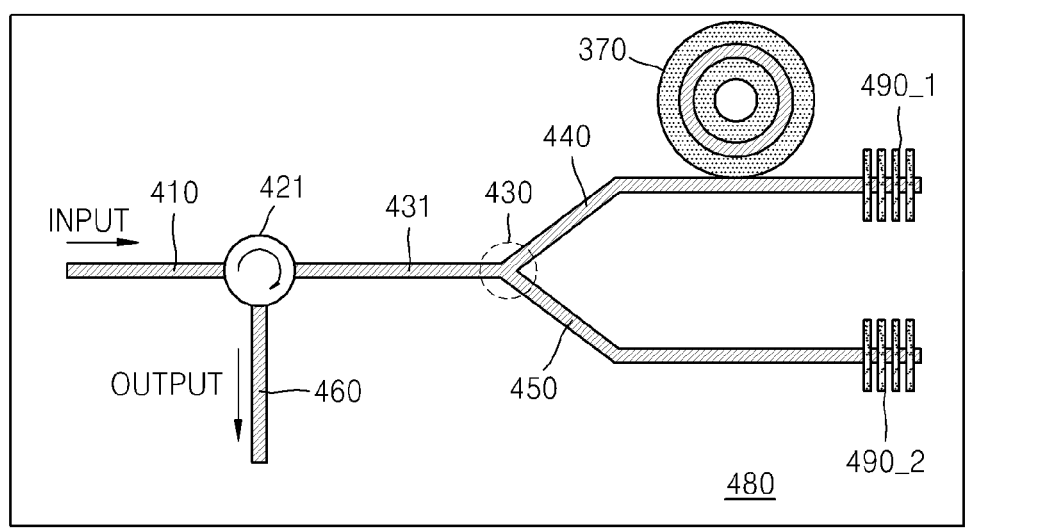
FIG. 10B is a diagram illustrating a circulator operating as a first connection unit in the optical modulator of FIG. 10A.

FIG. 10A is a diagram illustrating an optical modulator comprising a ring-resonant-type phase modulation unit according to an embodiment of the inventive concept, and FIG. 10B is a diagram illustrating a circulator operating as a first connection unit in the optical modulator of FIG. 10A.

Unlike in optical modulators 400_1 and 400_2 of FIGS. 8A and 8B where straight-line-type phase modulation unit 170 is formed on split waveguide 440, in optical modulators 600_1 and 600_2 of FIGS. 10A and 10B, ring-resonant-type phase modulation unit 370 is formed on split waveguide 440. Ring-resonant-type phase modulation unit 370 has already been described with reference to FIG. 6 and thus will not be further described here.

Figure 10C:
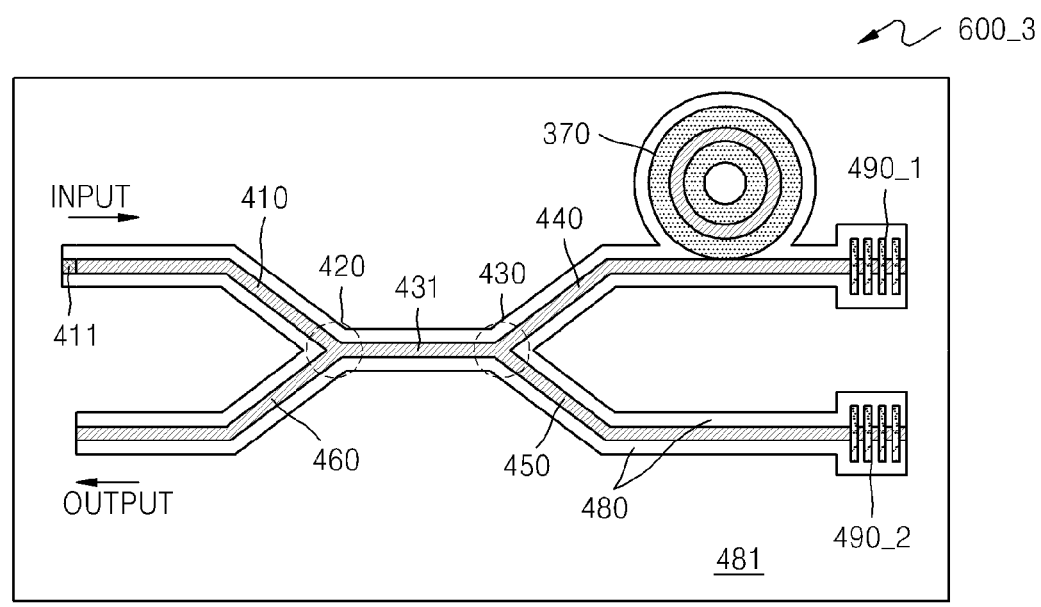
FIGS. 10C and 10D are diagrams illustrating the optical modulators of FIGS. 10A and 10B formed on a bulk-Si substrate.
Figure 10D:
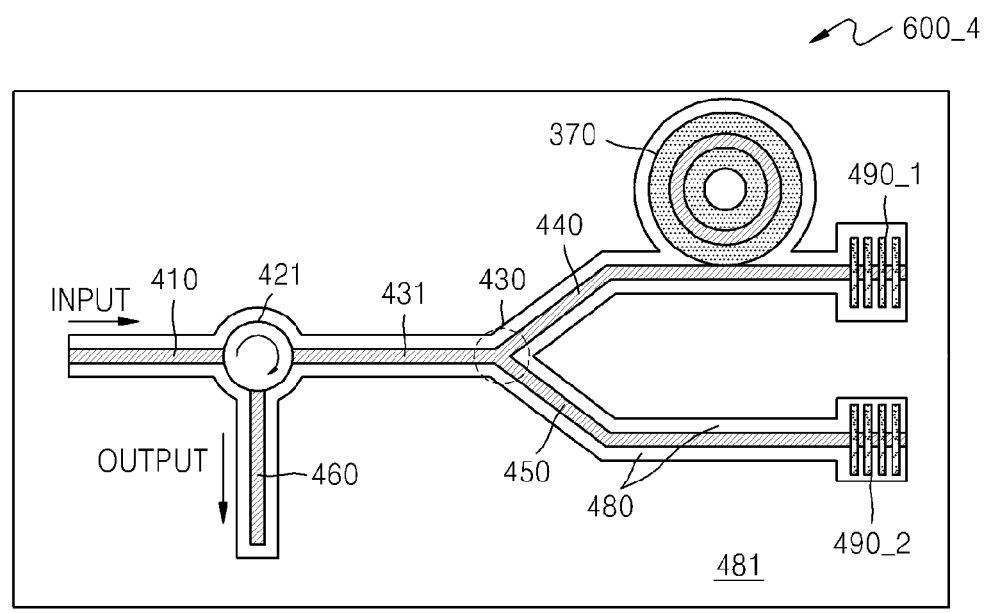

FIGS. 10C and 10D are diagrams illustrating the optical modulators of FIGS. 10A and 10B formed on a bulk-Si substrate.

The optical modulators of FIGS. 10C and 10D are optical modulators 600_3 and 600_4 formed on a bulk-Si substrate. In the optical modulators of FIGS. 10C and 10D, the bulk-Si substrate described with reference to FIGS. 2 through 5C is applied to optical modulators 600_1 and 600_2 of FIGS. 10A and 10B. More specifically, bulk-Si substrate 481 used in optical modulators 600_3 and 600_4 of FIGS. 10C and 10D comprises a trench etched to a predetermined width and a predetermined depth. Bottom cladding layer 480 is formed in the trench of bulk-Si substrate 481, and waveguides 410, 430, 440, and 460, ring-resonant-type phase modulation unit 370, and reflection units 490_1 and 490_2 are formed on bottom cladding layer 480.

Figure 11A:
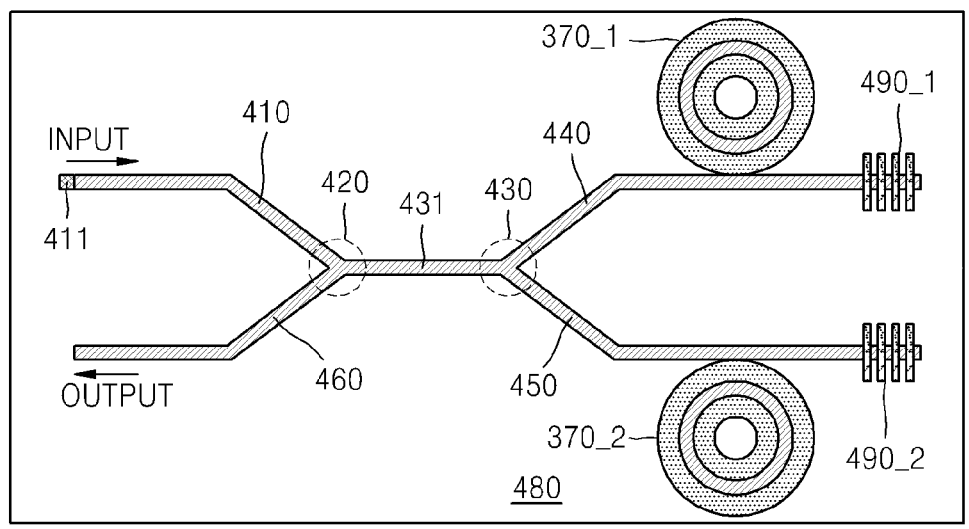
FIG. 11A is a diagram illustrating an optical modulator comprising a ring-resonant-type phase modulation unit according to another embodiment of the inventive concept.
Figure 11B:
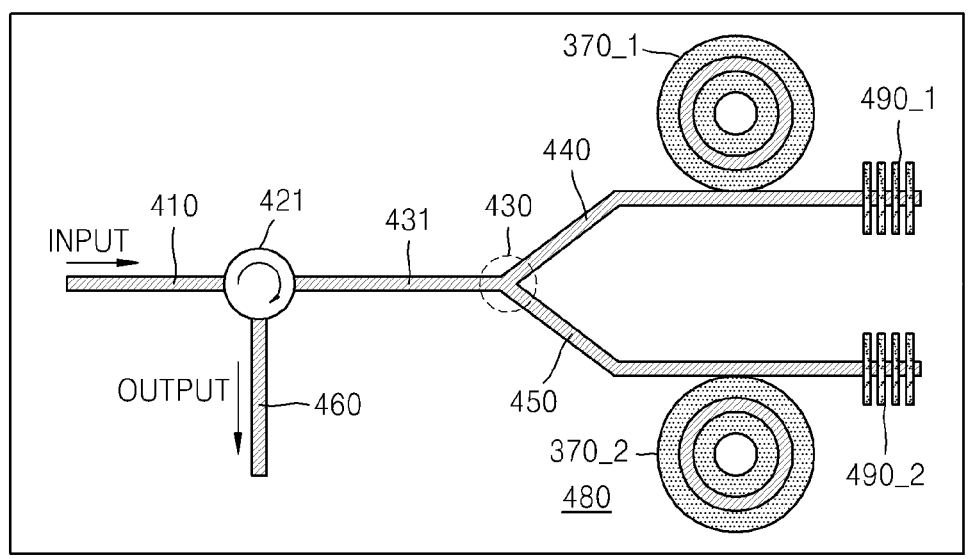
FIG. 11B is a diagram illustrating a circulator operating as a first connection unit in the optical modulator of FIG. 11A.

FIG. 11A is a diagram illustrating an optical modulator comprising a ring-resonant-type phase modulation unit according to another embodiment of the inventive concept, and FIG. 11B is a diagram illustrating a circulator operating as a first connection unit in the optical modulator of FIG. 11A.

Unlike optical modulators 600_1 and 600_2 of FIGS. 10A and 10B where ring-resonant-type phase modulation unit 370 is formed on one of split waveguides 440 and 450, for example, split waveguide 440, optical modulators 700_1 and 700_2 of FIGS. 11A and 11B have ring-resonant-type phase modulation units 370_1 and 370_2 formed on all of split waveguides 440 and 450.

Figure 11C:
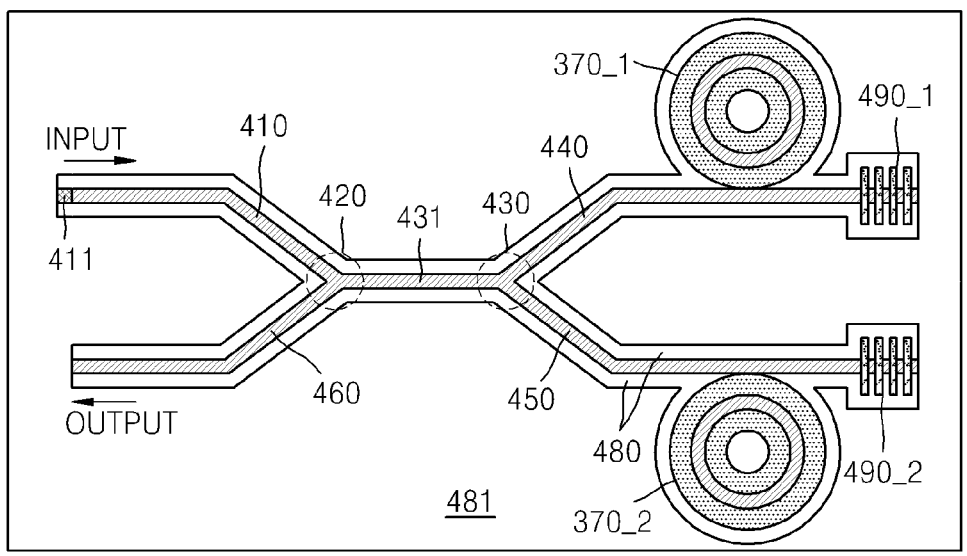
FIGS. 11C and 11D are diagrams illustrating the optical modulators of FIGS. 11A and 11B formed on a bulk-Si substrate.
Figure 11D:
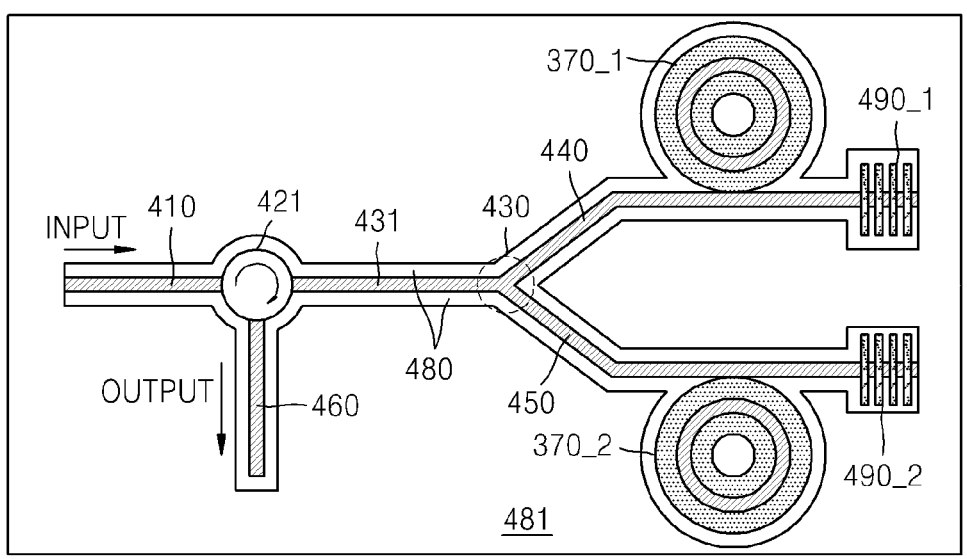

FIGS. 11C and 11D are diagrams illustrating optical modulators of FIGS. 11A and 11B formed on a bulk-Si substrate.

The optical modulators of FIGS. 11C and 11D are optical modulators 700_3 and 700_4 formed on a bulk-Si substrate. In the optical modulators of FIGS. 11C and 11D, the bulk-Si substrate described with reference to FIGS. 2 through 5C is applied to optical modulators 700_1 and 700_2 of FIGS. 11A and 11B. More specifically, bulk-Si substrate 481 used in optical modulators 700_3 and 700_4 of FIGS. 11C and 11D comprises a trench etched to a predetermined width and a predetermined depth. Bottom cladding layer 480 is formed in the trench of bulk-Si substrate 481, and waveguides 410, 430, 440, and 460, ring-resonant-type phase modulation units 370_1 and 370_2, and reflection units 490_1 and 490_2 are formed on bottom cladding layer 480.

Figure 12A:
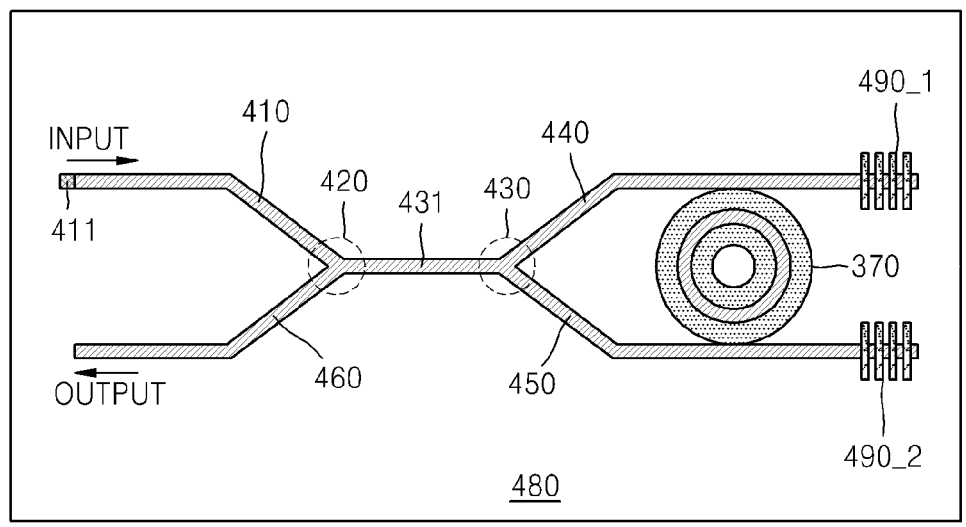
FIG. 12A is a diagram illustrating an optical modulator comprising a ring-resonant-type phase modulation unit according to another embodiment of the inventive concept.
Figure 12B:
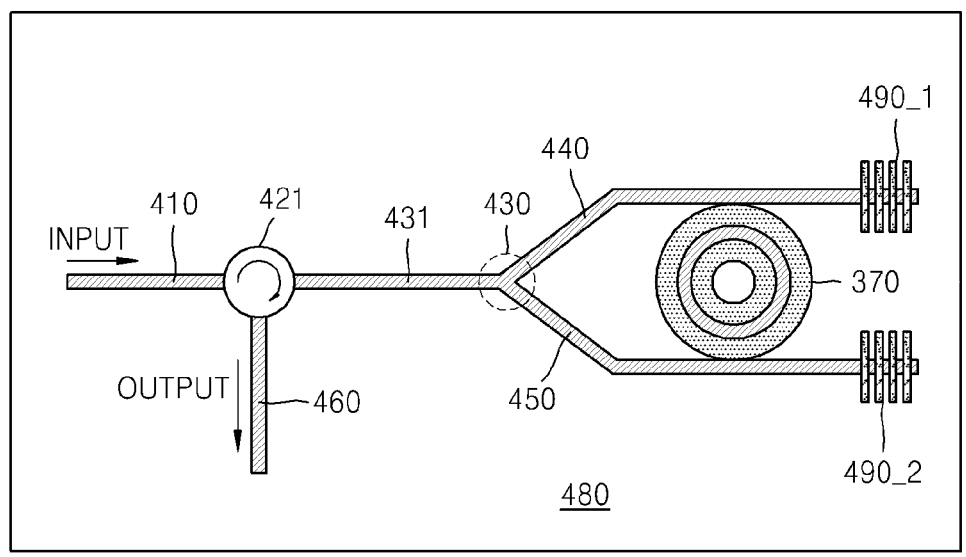
FIG. 12B is a diagram illustrating a circulator operating as a first connection unit in the optical modulator of FIG. 12A.

FIG. 12A is a diagram illustrating an optical modulator comprising a ring-resonant-type phase modulation unit according to another embodiment of the inventive concept, and FIG. 12B is a diagram illustrating a circulator operating as a first connection unit in the optical modulator of FIG. 12A.

In optical modulators 800_1 and 800_2 of FIGS. 12A and 12B, ring-resonant-type phase modulation unit 370 is formed between split waveguides 440 and 450. In optical modulators 800_1 and 800_2, ring-resonant-type phase modulation unit 370 is formed between split waveguide 440 and split waveguide 450, allowing optical modulators 800_1 and 800_2 to be miniaturized while improving modulation efficiency.

Figure 12C:
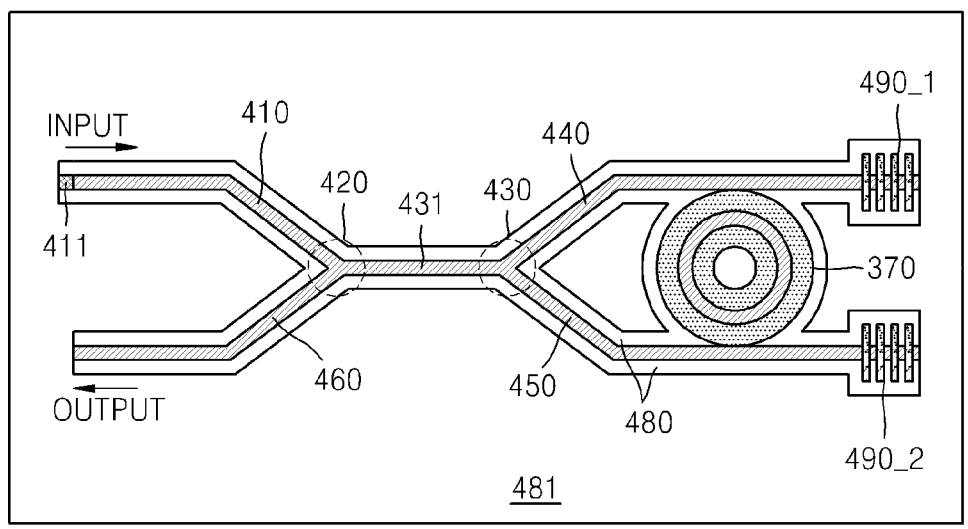
FIGS. 12C and 12D are diagrams illustrating the optical modulators of FIGS. 12A and 12B formed on a bulk-Si substrate.
Figure 12D:
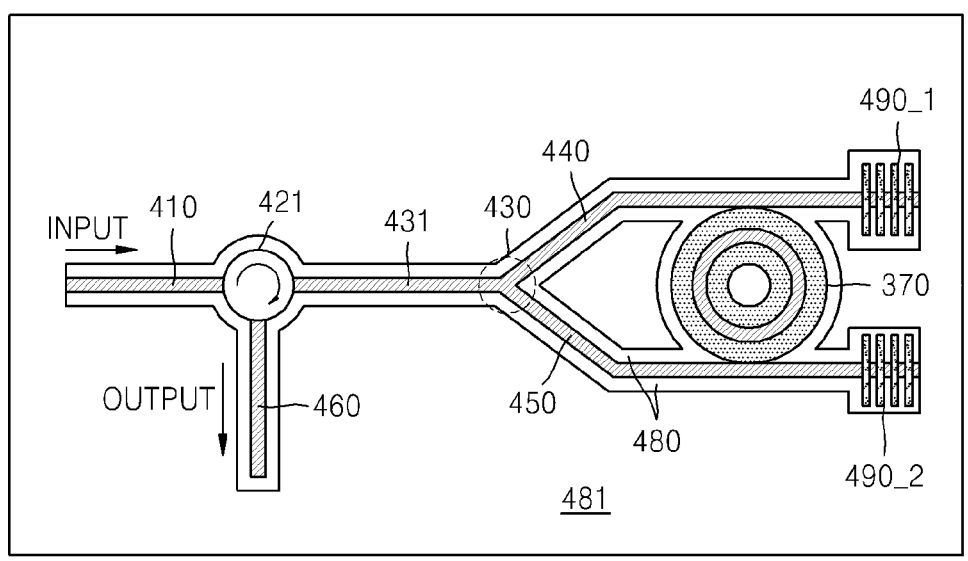

FIGS. 12C and 12D are diagrams illustrating the optical modulators of FIGS. 12A and 12B formed on a bulk-Si substrate.

The optical modulators of FIGS. 12C and 12D are optical modulators 800_3 and 800_4 formed on a bulk-Si substrate. In the optical modulators of FIGS. 12C and 12D, the bulk-Si substrate described with reference to FIGS. 2 through 5C is applied to optical modulators 800_1 and 800_2 of FIGS. 12A and 12B. More specifically, bulk-Si substrate 481 used in optical modulators 800_3 and 800_4 of FIGS. 12C and 12D comprises a trench etched to a predetermined width and a predetermined depth. Bottom cladding layer 480 is formed in the trench of bulk-Si substrate 481, and waveguides 410, 430, 440, and 460, ring-resonant-type phase modulation unit 370_1, and reflection units 490_1 and 490_2 are formed on bottom cladding layer 480.

Figure 13A:
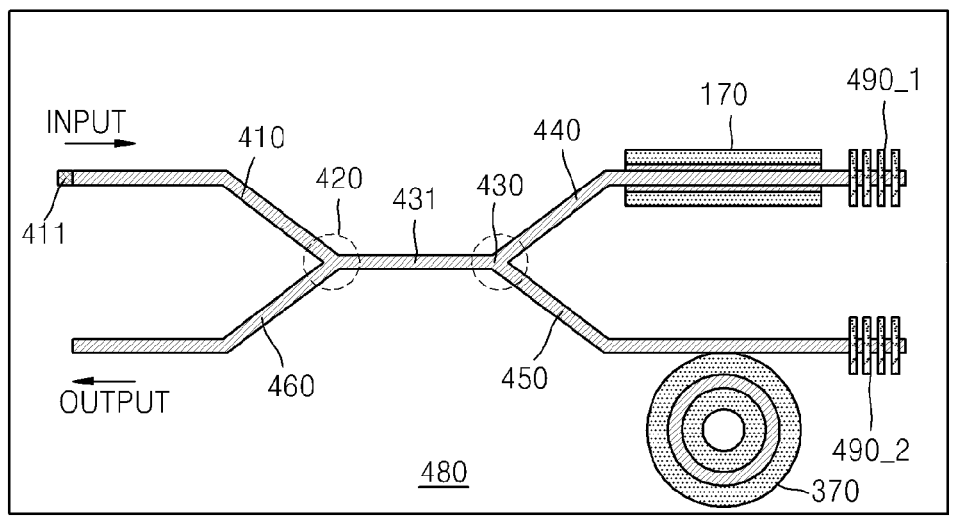
FIG. 13A is a diagram illustrating a hybrid optical modulator comprising a straight-line-type phase modulation unit and a ring-resonant-type phase modulation unit according to an embodiment of the inventive concept.
Figure 13B:
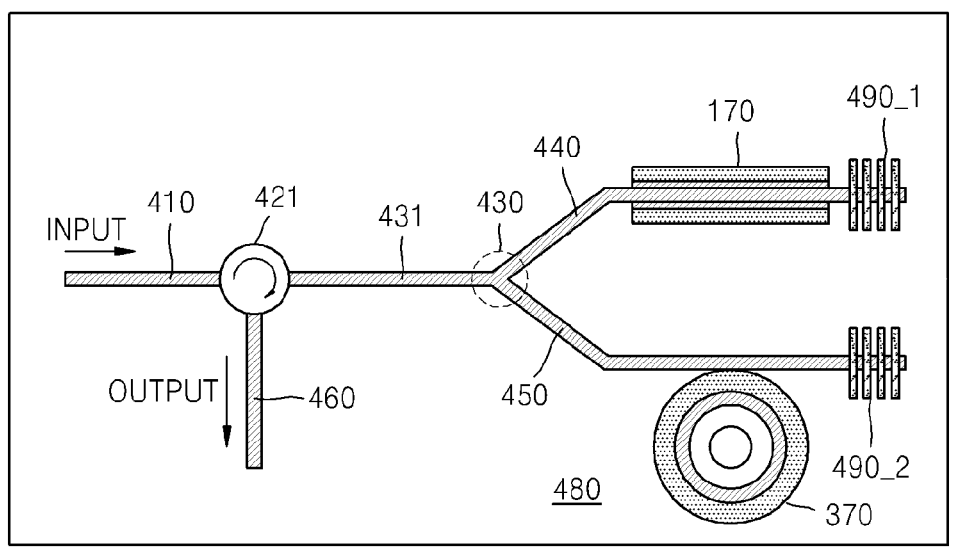
FIG. 13B is a diagram illustrating a circulator operating as a first connection unit in the hybrid optical modulator of FIG. 13A.

FIG. 13A is a diagram illustrating a hybrid optical modulator comprising a straight-line-type phase modulation unit and a ring-resonant-type phase modulation unit according to an embodiment of the inventive concept, and FIG. 13B is a diagram illustrating a circulator operating as a first connection unit in the hybrid optical modulator of FIG. 13A.

In optical modulators 900_1 and 900_2 of FIGS. 13A and 13B, straight-line-type phase modulation unit 170 is formed on split waveguide 440 and ring-resonant-type phase modulation unit 370 is formed on split waveguide 450.

Figure 13C:
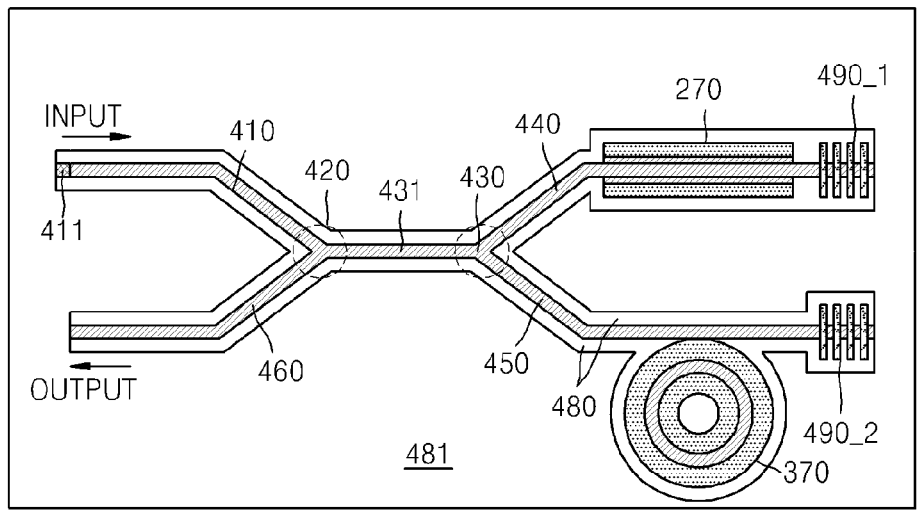
FIGS. 13C and 13D are diagrams illustrating the hybrid optical modulators of FIGS. 13A and 13B formed on a bulk-Si substrate.
Figure 13D:
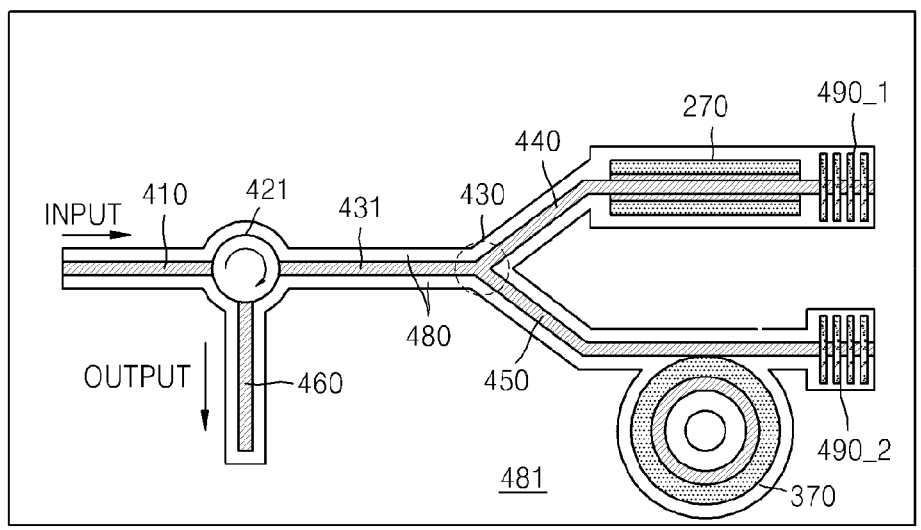

FIGS. 13C and 13D are diagrams illustrating the hybrid optical modulators of FIGS. 13A and 13B formed on a bulk-Si substrate.

The optical modulators of FIGS. 13C and 13D are optical modulators 900_3 and 900_4 formed on a bulk-Si substrate. In the optical modulators of FIGS. 13C and 13D, the bulk-Si substrate described with reference to FIGS. 2 through 5C is applied to optical modulators 900_1 and 900_2 of FIGS. 13A and 13B. More specifically, bulk-Si substrate 481 used in optical modulators 900_3 and 900_4 of FIGS. 13C and 13D comprises a trench etched to a predetermined width and a predetermined depth. Bottom cladding layer 480 is formed in the trench of bulk-Si substrate 481. Waveguides 410, 430, 440, and 460, straight-line-type phase modulation unit 270, ring-resonant-type phase modulation unit 370, and reflection units 490_1 and 490_2 are formed on bottom cladding layer 480.

Figure 14A:
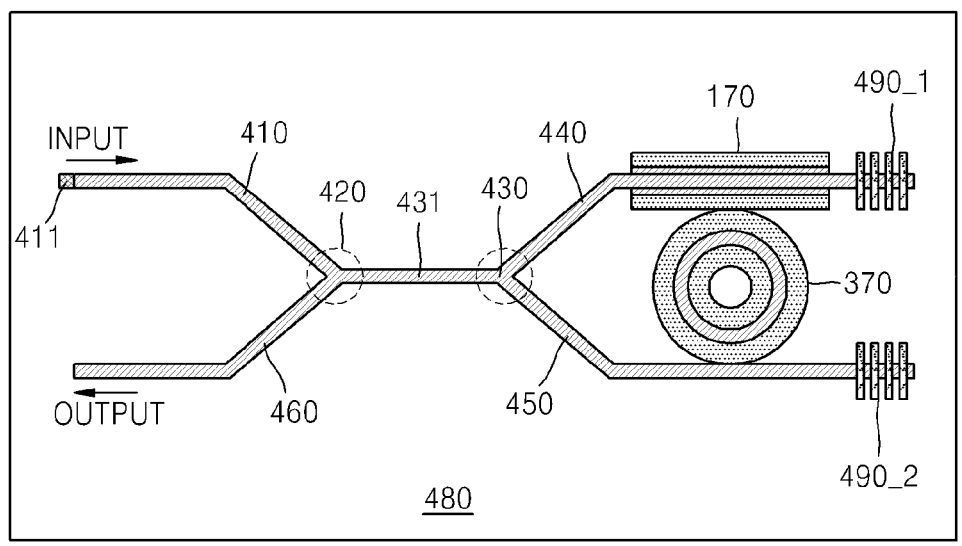
FIG. 14A is a diagram illustrating a hybrid optical modulator comprising a straight-line-type phase modulation unit and a ring-resonant-type phase modulation unit according to another embodiment of the inventive concept.
Figure 14B:
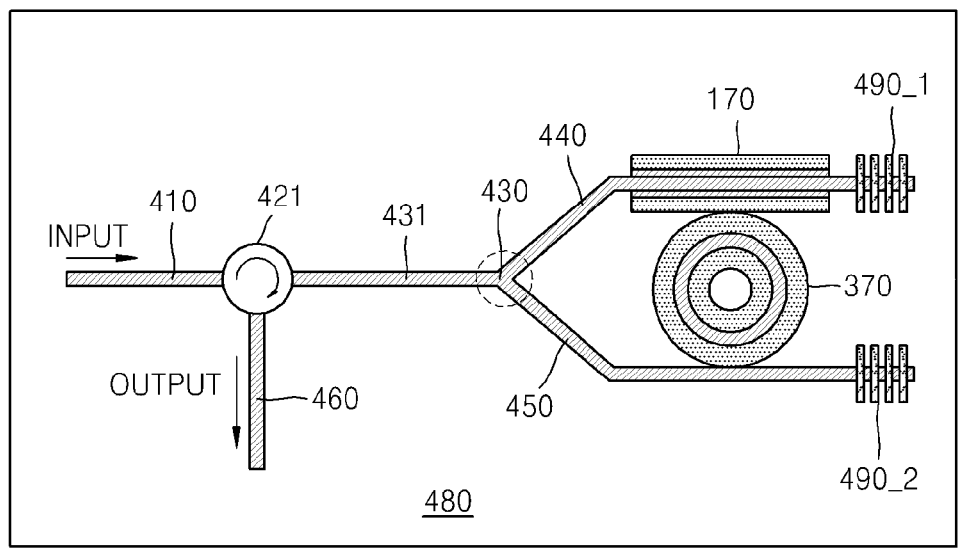
FIG. 14B is a diagram illustrating a circulator operating as a first connection unit in the hybrid optical modulator of FIG. 14A.

FIG. 14A is a diagram illustrating a hybrid optical modulator comprising a straight-line-type phase modulation unit and a ring-resonant-type phase modulation unit according to another embodiment of the inventive concept, and FIG. 14B is a diagram illustrating a circulator operating as a first connection unit in the hybrid optical modulator of FIG. 14A.

In optical modulators 1000_1 and 1000_2 of FIGS. 14A and 14B, straight-line-type phase modulation unit 170 is formed on predetermined split waveguide 440 and ring-resonant-type phase modulation unit 370 is formed between split waveguide 440 and split waveguide 450.

Figure 14C:
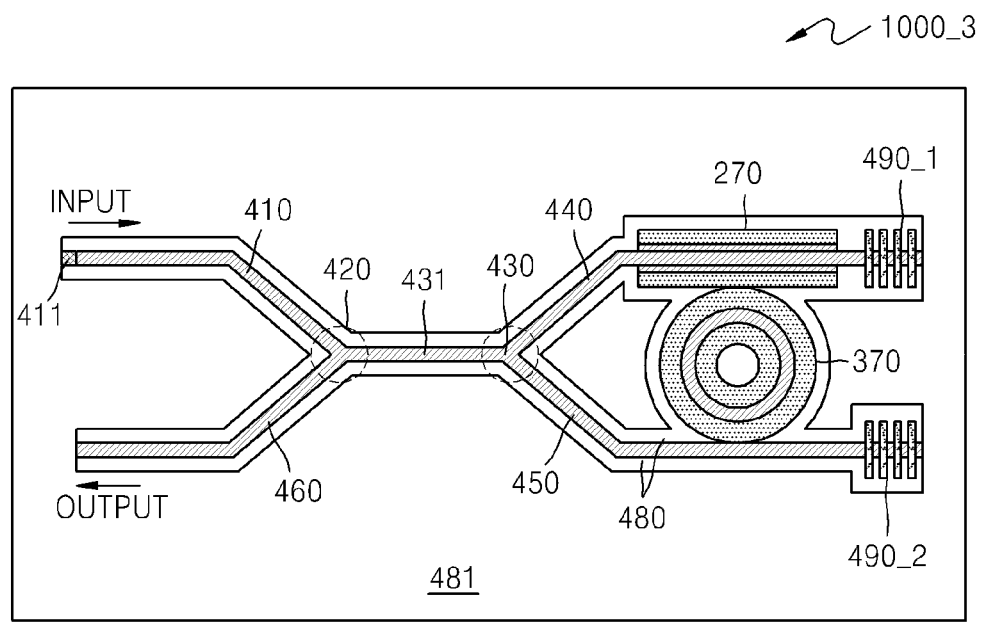
FIGS. 14C and 14D are diagrams illustrating the hybrid optical modulators of FIGS. 14A and 14B formed on a bulk-Si substrate.
Figure 14D:
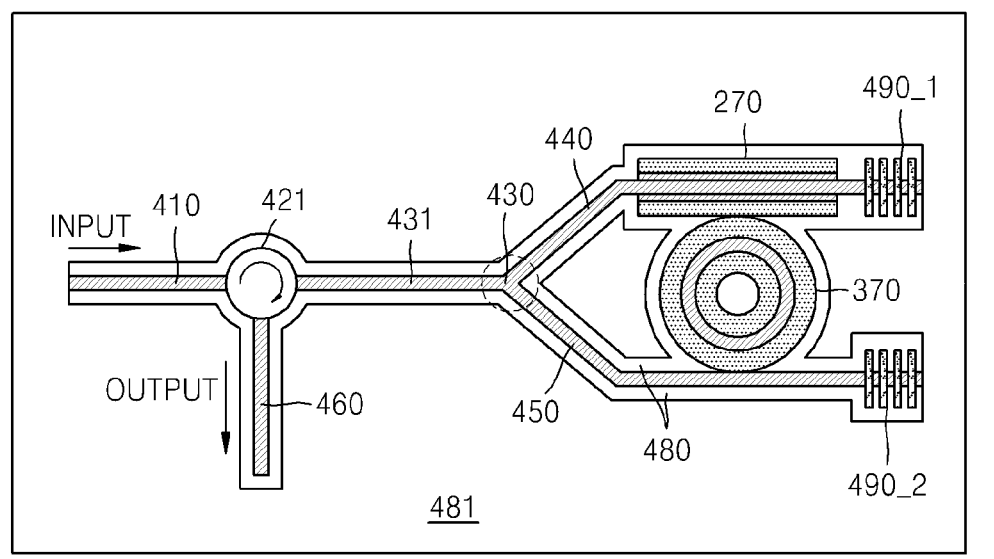

FIGS. 14C and 14D are diagrams illustrating the hybrid optical modulators of FIGS. 14A and 14B implemented on a bulk-Si substrate.

The optical modulators of FIGS. 14C and 14D are optical modulators 1000_3 and 1000_4 formed on a bulk-Si substrate. In the optical modulators of FIGS. 14C and 14D, the bulk-Si substrate described with reference to FIGS. 2 through 5C is applied to optical modulators 1000_1 and 1000_2 of FIGS. 14A and 14B. More specifically, bulk-Si substrate 481 used in optical modulators 1000_3 and 1000_4 of FIGS. 14C and 14D comprises a trench etched to a predetermined width and a predetermined depth. Bottom cladding layer 480 is formed in the trench of bulk-Si substrate 481, and waveguides 410, 430, 440, and 460, straight-line-type phase modulation unit 270, ring-resonant-type phase modulation unit 370, and reflection units 490_1 and 490_2 are formed on bottom cladding layer 480.

Figure 15A:
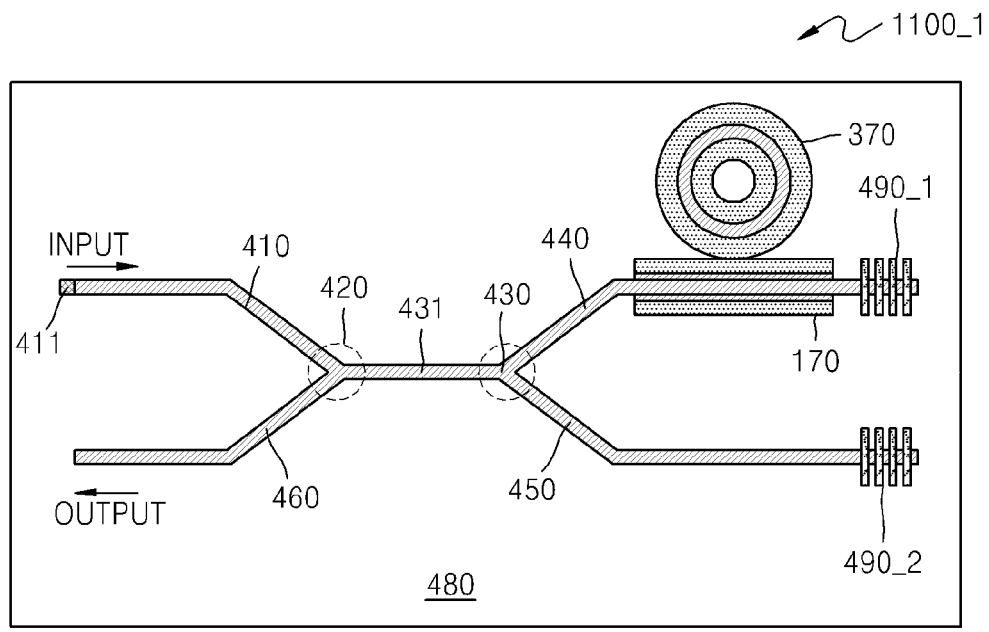
FIG. 15A is a diagram illustrating a hybrid optical modulator comprising a straight-line-type phase modulation unit and a ring-resonant-type phase modulation unit according to another embodiment of the inventive concept.
Figure 15B:
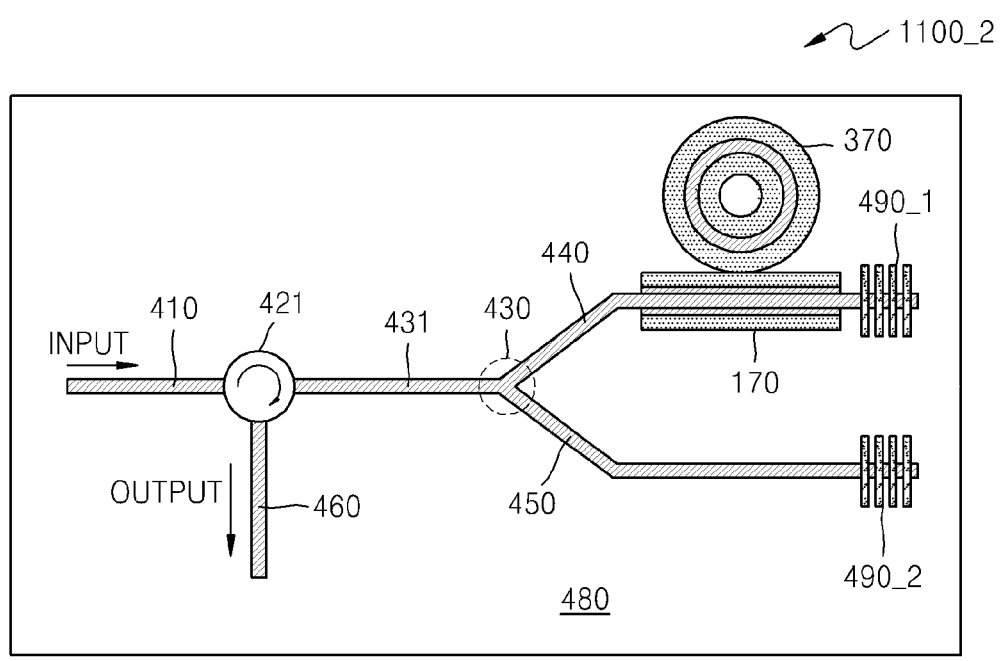
FIG. 15B is a diagram illustrating a circulator operating as a first connection unit in the hybrid optical modulator of FIG. 15A.

FIG. 15A is a diagram illustrating a hybrid optical modulator comprising a straight-line-type phase modulation unit and a ring-resonant-type phase modulation unit according to another embodiment of the inventive concept, and FIG. 15B is a diagram illustrating a circulator operating as a first connection unit in the hybrid optical modulator of FIG. 15A.

In optical modulators 1100_1 and 1100_2 of FIGS. 15A and 15B, both straight-line-type phase modulation unit 170 and ring-resonant-type phase modulation unit 370 are formed on split waveguide 440.

Figure 15C:
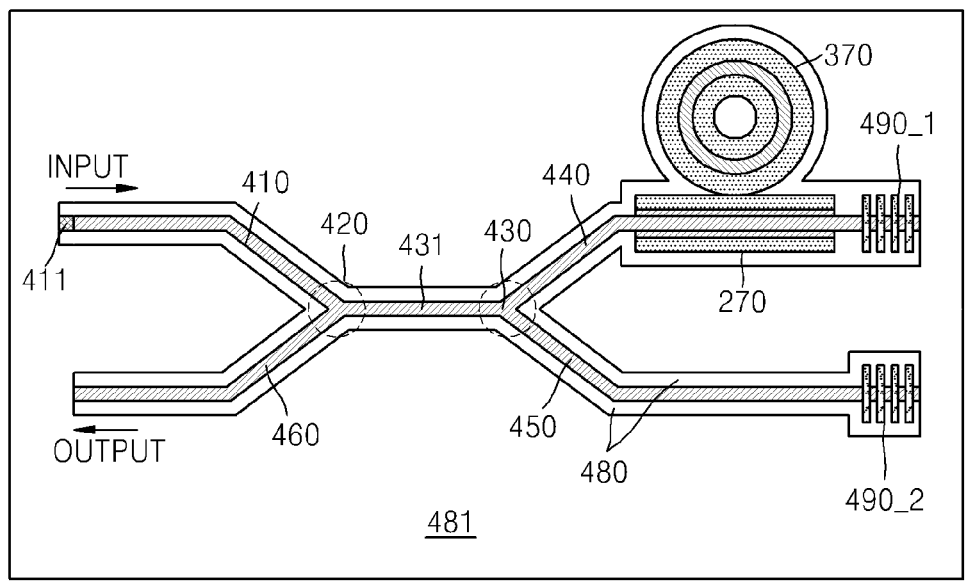
FIGS. 15C and 15D are diagrams illustrating the hybrid optical modulators of FIGS. 15A and 15B formed on a bulk-Si substrate.
Figure 15D:
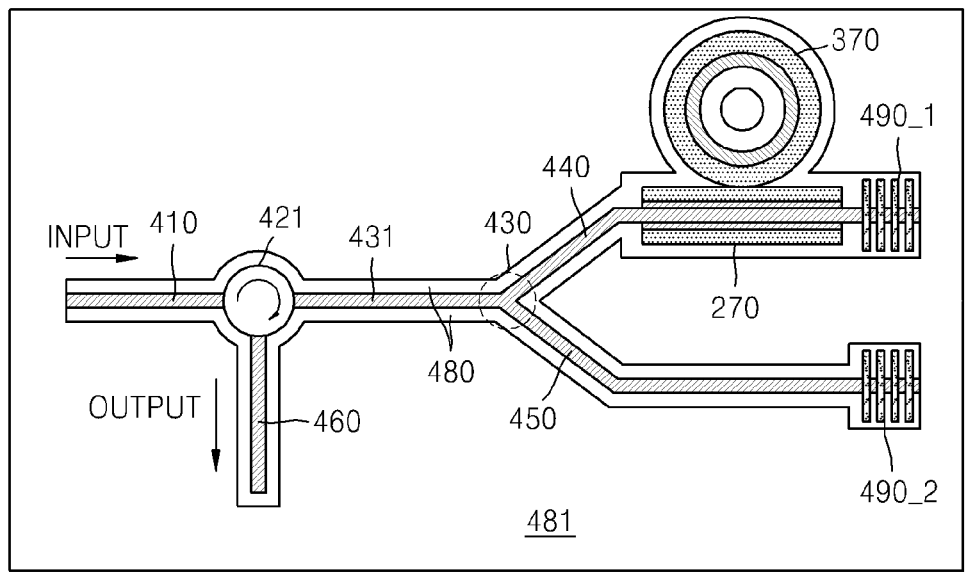

FIGS. 15C and 15D are diagrams illustrating the hybrid optical modulators of FIGS. 15A and 15B formed on a bulk-Si substrate.

The optical modulators of FIGS. 15C and 15D are optical modulators 1100_3 and 1100_4 formed on a bulk-Si substrate. In the optical modulators of FIGS. 15C and 15D, the bulk-Si substrate described with reference to FIGS. 2 through 5C is applied to optical modulators 1100_1 and 1100_2 of FIGS. 15A and 15B. More specifically, bulk-Si substrate 481 used in optical modulators 1100_3 and 1100_4 of FIGS. 15C and 15D comprises a trench etched to a predetermined width and a predetermined depth. Bottom cladding layer 480 is formed in the trench of bulk-Si substrate 481, and waveguides 410, 430, 440, and 460, straight-line-type phase modulation unit 270, ring-resonant-type phase modulation unit 370, and reflection units 490_1 and 490_2 are formed on bottom cladding layer 480.

Figure 16A:
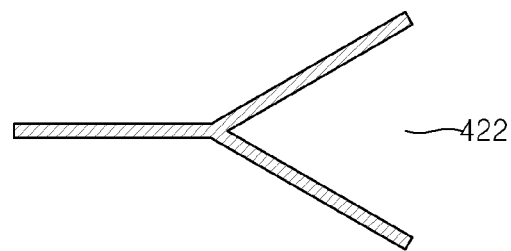
FIGS. 16A, 16B, and 16C are diagrams illustrating an embodiment of a connection unit used in an optical modulator according to the inventive concept.
Figure 16B:
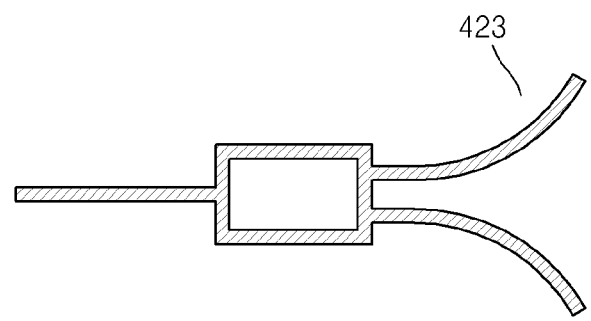
Figure 16C:
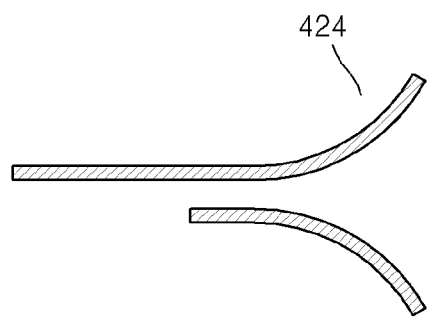

FIGS. 16A, 16B, and 16C are diagrams illustrating an embodiment of a connection unit used in an optical modulator according to the inventive concept.

FIG. 16A illustrates a connection unit comprising a Y branch 422. FIG. 16B illustrates a connection unit comprising a multi mode-interference (MMI) coupler 423. FIG. 16C illustrates a connection unit comprising an evanescent coupler 424. In various alternative embodiments, other types of couplers can be used as a connection unit for an optical modulator.

Figure 17:
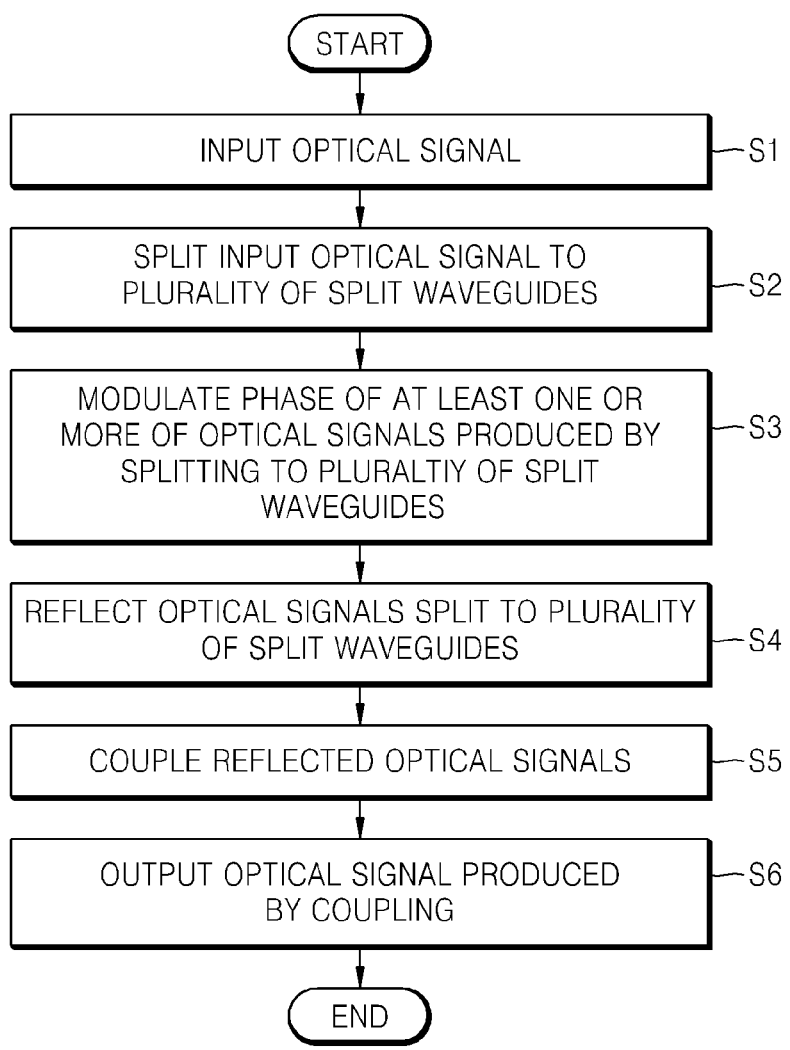
FIG. 17 is a flowchart illustrating a method of operating an optical modulator according to an embodiment of the inventive concept.

FIG. 17 is a flowchart illustrating a method of operating an optical modulator according to an embodiment of the inventive concept. In the description that follows, example method steps are indicated by parentheses.

Referring to FIG. 17, an optical signal is input into input waveguide 410 (S1). The input optical signal then passes through first connection unit 420 connected to input waveguide 410 and output waveguide 460, passes through connection waveguide 431, and is split into split waveguides 440 and 450 in second connection unit 430 (S2).

Straight-line-type phase modulation unit 170 and/or ring-resonant-type phase modulation unit 370 modulate at least one or more of split waveguides 440 and 450 to modulate the phase of the optical signal passing through the at least one or more of split waveguides 440 and 40 (S3).

Reflection units 490_1 and 490_2 are positioned at respective ends of split waveguides 440 and 450 and they reflect the optical signals split into split waveguides 490_1 and 490_2 (S4).

Second connection unit 430 combines the optical signals reflected by reflection units 490_1 and 490_2 (S5). More specifically, the optical signal split to a predetermined split waveguide is phase-modulated by straight-line-type phase modulation unit 170, ring-resonant-type phase modulation unit 370, and a hybrid phase modulation unit formed by coupling the straight-line-type phase modulation 170 and ring-resonant-type phase modulation unit 370. The phase-modulated optical signal is reflected by a reflection unit, returns to the phase modulation unit to be phase-modulated again, and then arrives at second connection unit 430. On the other hand, the optical signal transmitted to the split waveguide that does not include the phase modulation unit is reflected by a reflection unit without being phase-modulated and then returns to second connection unit 430.

The optical signals arriving at second connection unit 430 are combined in second connection unit 430 by an interferometer such as a Mach-Zehnder interferometer.

The combined optical signal produced by second connection unit 430 has a strength of 1 upon undergoing constructive interference and a strength of 0 upon undergoing destructive interference.

The combined optical signal undergoing constructive interference or destructive interference in second connection unit 430 is output through output waveguide 460 (S6). More specifically, the combined optical signal passes to first connection unit 420 through connection waveguide 431. The combined optical signal produced by the coupling in second connection unit 430 is split to output waveguide 460 and input waveguide 410 in first connection unit 420. Isolator 411 or another cancellation mechanism cancels the optical signal output through input waveguide 410. Isolator 411 passes an optical signal input from an external source to input waveguide 410 and blocks the combined optical signal produced by second connection unit 430.

On the other hand, the combined optical signal produced by second connection unit 430 is output through output waveguide 460. Circulator 421 allows the combined optical signal produced in second connection unit 430 to be output through output waveguide 460.

Figure 18:
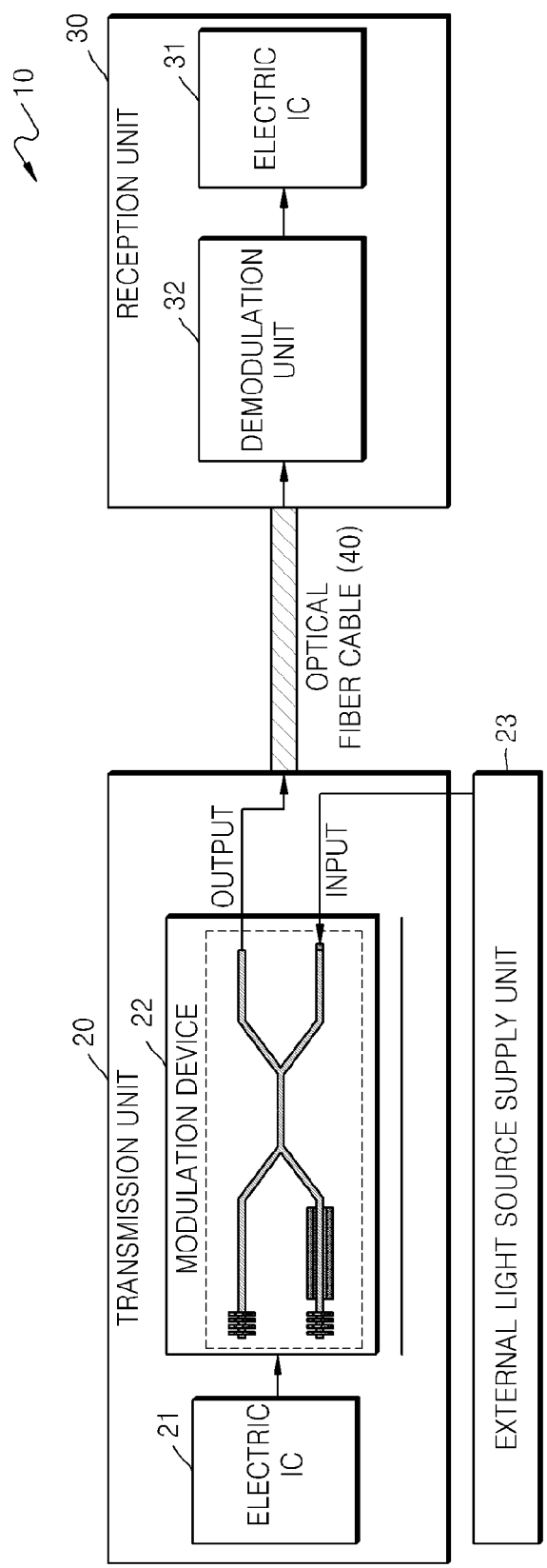
FIG. 18 is a block diagram of an optical communication system comprising an optical modulator according to an embodiment of the inventive concept.

FIG. 18 is a block diagram of an optical communication system 10 comprising an optical modulator according to an embodiment of the inventive concept.

Referring to FIG. 18, optical communication system 10 comprises a transmission unit 20 and a reception unit 30. Transmission unit 20 transmits an electric signal to reception unit 30 through an optical fiber cable 40.

Transmission unit 20 comprises an electric IC 21 for generating the electric signal and a modulation device 22 for modulating an optical signal to carry a representation of the electric signal to reception unit 30. Reception unit 30 comprises a demodulation device 32 for demodulating the optical signal to generate an electric signal and an electric IC 31 for receiving the generated electric signal.

An external light source supply unit 23 supplies light to modulation device 22. An optical signal provided by the external light source supply unit 23 is phase-modulated by modulation device 22 to carry a representation of the electric signal, and the phase-modulated optical signal is transmitted to reception unit 30. Modulation device 22 can comprise optical modulator such as one of those described above. As an example, FIG. 18 shows that optical modulator 400_1 of FIG. 8A is used as modulation device 22 of optical communication system 10.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims.

What is claimed is:

1. A modulator, comprising:
    a bulk-silicon substrate having an upper surface, and a trench extending downwardly form the upper surface, wherein the trench has a width less than that of the substrate and a depth less than a thickness of the substrate;
    a bottom cladding layer occupying at least a portion of the trench in the bulk-silicon substrate;
    a plurality of waveguides each extending on the bottom cladding layer;
    a phase modulation unit comprising one of the waveguides, a first electrode, and a second electrode, and said phase modulation unit being configured to modulate a phase of an optical signal propagating along said one of the waveguide by modulating a refractive index of the waveguide,
    wherein said one of the waveguides has a slab and a core,
    the slab comprises silicon and is disposed on the bottom cladding layer, and the slab has first and second opposite sides, a first P-type carrier region in the first side and electrically connected to the first electrode, and a first N-type carrier region in the second side and electrically connected to the second electrode;
    the core is disposed on the slab and spans only a portion of the slab in a direction parallel to an upper surface of the bulk-silicon substrate such that the core projects upwardly relative to an upper surface of the slab, and the core has a P-type carrier region contiguous with the first P-type carrier region, and an N-type carrier region contiguous with the first N-type carrier region,
    the P-type carrier region and the N-type carrier region of the core being located in opposite sides of the core, respectively and each extending to the top of the core; and
    a top cladding layer on the plurality of waveguides.

2. The modulator of claim 1, wherein the thickness of the bottom cladding layer, in a direction perpendicular to the bulk-silicon substrate, is less than or equal to said depth of the trench such that the bottom cladding layer is confined to an area within the trench.

3. The modulator of claim 1, wherein a width of the bottom cladding layer, in a direction parallel to the upper surface of the substrate and as taken directly under the phase modulation unit, is within a range of 1.5 μm to 10.0 μm.

4. The modulator of claim 1, wherein a width of the bottom cladding layer, in a direction parallel to the upper surface of the substrate and as taken under each of the plurality of waveguides, is within a range of about 1.0 μm to 10.0 μm.

5. The modulator of claim 1, wherein the widthwise center of the phase modulation unit and the widthwise center of the bottom cladding layer in a direction parallel to the upper surface of the substrate are offset from each other by a distance in said direction within a range of 0.1 μm to 5.0 μm.

6. The modulator of claim 1, wherein the first P-type carrier region and the first N-type carrier region are symmetrically with respect to the core.

7. The modulator of claim 1, wherein the slab consists of the first P-type and N-type regions, the core consists of said P-type carrier region and said N-type carrier region contiguous with the first P-type carrier region and the first N-type carrier region of the slab, respectively, and the P-type carrier regions are symmetrical with the N-type carrier regions.

8. A modulator, comprising:
a bulk-silicon substrate having an upper portion, and a trench in the upper portion of the bulk-silicon substrate;
a bottom cladding layer occupying at least a portion of the trench in the bulk-silicon substrate;
a waveguide the entirety of which extends along the bottom cladding layer, the waveguide comprising a core, a first P-type carrier region extending laterally outwardly beyond one side of the core, and a first N-type carrier region extending laterally outwardly beyond the other side of the core, and
wherein said one side of the core comprises a P-type carrier region contiguous with said first P-type carrier region and extending to the top of the core, and said other side of the core comprises an N-type carrier region contiguous with said first N-type carrier region and extending to the top of the core;
a first electrode electrically connected to the first P-type carrier region;
a second electrode electrically connected to the first N-type carrier region; and
a top cladding layer on the waveguide.

9. The modulator of claim 8, wherein the bottom cladding layer is confined to an area within the trench.

10. The modulator of claim 9, wherein the bottom cladding layer fills the trench completely such that an upper surface of the bottom cladding layer and the upper surface of the substrate are coplanar.

11. The modulator of claim 9, wherein the bottom cladding layer occupies only a lower portion of the trench such that an upper surface of the bottom cladding layer is disposed at a level beneath the level of the upper surface of the substrate.

12. The modulator of claim 8, wherein the waveguide comprises a layer of silicon in the form of a slab, the slab has opposite sides and comprises the first P-type and N-type carrier regions in the opposite sides, respectively, and the core is disposed on the slab.

13. The modulator of claim 12, wherein said electrodes extend through the top cladding layer.

14. The modulator of claim 12, wherein the bottom cladding layer comprises $SiO_2$.

15. The modulator of claim 8, further comprising another waveguide optically coupled to the core, and wherein the trench has one section extending along with and beneath the slab and another section extending along with and beneath said at least one other waveguide, a first portion of the bottom cladding layer occupies said one section of the trench, a second portion of the cladding layer occupies said another section of the trench, and said at least one other waveguide comprises a core disposed directly on said another section of the bottom cladding layer.

16. The modulator of claim 15, wherein said waveguides each have the form of a straight line, and said one section of the trench is wider than said another section of the trench.

17. The modulator of claim 15, wherein said one section of the trench is wider than said another section of the trench, the width of the first portion of the cladding layer is within a range of 1.5 µm to 10.0 µm, and the width of the second portion of the cladding layer is within a range of 1.0 µm to 10.0 µm.

18. A modulator, comprising:
a bulk-silicon substrate;
a bottom cladding layer;
a plurality of waveguides extending on the bottom cladding layer;
a top cladding layer on the plurality of waveguides;
a phase modulation unit comprising one of the waveguides, and said phase modulation unit being configured to modulate a phase of an optical signal propagating along said one of the waveguides by modulating a refractive index of the waveguide, and
wherein the bulk-silicon substrate has an upper portion, and a trench extending in the upper portion under each of the waveguides,
the bottom cladding layer occupies at least a portion of the trench in the bulk-silicon substrate, and
said one of the waveguides has a slab and a core,
the slab is disposed on the bottom cladding layer directly above the trench,
the slab comprises silicon and has first and second opposite sides, a P-type carrier region in the first side, and a N-type carrier region in the second side,
the core is disposed on the slab and spans only a portion of the slab in a lateral direction parallel to an upper surface of the bulk-silicon substrate such that the core projects upwardly relative to an upper surface of the slab,
the core has a P-type carrier region and an N-type carrier region,
the P-type carrier region and the N-type carrier region of the core being located in opposite sides of the core, respectively, the P-type region of the core extending from the P-type region of the slab to the top of the core, and the N-type carrier region of the core extending from the N-type region of the slab to the top of the core.

* * * * *